US009017892B2

(12) United States Patent
McLean et al.

(10) Patent No.: US 9,017,892 B2
(45) Date of Patent: Apr. 28, 2015

(54) ELECTROCHEMICAL CELLS HAVING CURRENT-CARRYING STRUCTURES UNDERLYING ELECTROCHEMICAL REACTION LAYERS

(71) Applicant: Société BIC, Clichy (FR)

(72) Inventors: Gerard F McLean, West Vancouver (CA); Anna Stukas, Vancouver (CA); Jeremy Schrooten, Mission (CA)

(73) Assignee: Societe BIC, Clichy (FR)

(*) Notice: Subject to any disclaimer, the term of this patent is extended or adjusted under 35 U.S.C. 154(b) by 0 days.

(21) Appl. No.: 14/152,043

(22) Filed: Jan. 10, 2014

(65) Prior Publication Data

US 2014/0127601 A1    May 8, 2014

Related U.S. Application Data

(63) Continuation of application No. 13/535,880, filed on Jun. 28, 2012, now Pat. No. 8,628,890, which is a continuation of application No. 12/637,422, filed on Dec. 14, 2009, now Pat. No. 8,232,025, which is a continuation of application No. 11/047,560, filed on Feb. 2, 2005, now Pat. No. 7,632,587.

(60) Provisional application No. 60/567,648, filed on May 4, 2004, provisional application No. 60/608,879, filed on Sep. 13, 2004.

(51) Int. Cl.
*H01M 8/02* (2006.01)
*H01B 1/12* (2006.01)
*H01M 4/86* (2006.01)
*H01M 8/24* (2006.01)

(52) U.S. Cl.
CPC ............ *H01M 8/0202* (2013.01); *H01B 1/122* (2013.01); *H01M 4/8626* (2013.01); *H01M 8/0247* (2013.01); *H01M 8/0291* (2013.01); *H01M 8/0297* (2013.01); *H01M 8/241* (2013.01); *Y02E 60/50* (2013.01)

(58) Field of Classification Search
USPC .......................... 429/454, 468, 513, 517, 465
See application file for complete search history.

(56) References Cited

U.S. PATENT DOCUMENTS 3,402,230 A    9/1968    White, Jr.
4,708,812 A    11/1987    Hatfield
(Continued)

FOREIGN PATENT DOCUMENTS

CA    2408587 A    12/2001
CA    2408587 A1    12/2001
(Continued)

OTHER PUBLICATIONS

U.S. Appl. No. 11/047,558, Examiner Interview Summary mailed Oct. 17, 2006, 2 pgs.
(Continued)

*Primary Examiner* — Cynthia H Kelly
*Assistant Examiner* — Monique Wills
(74) *Attorney, Agent, or Firm* — Schwegman Lundberg & Woessner, P.A.

(57) ABSTRACT

An electrochemical cell structure has an electrical current-carrying structure which, at least in part, underlies an electrochemical reaction layer. The cell comprises an ion exchange membrane with a catalyst layer on each side thereof. The ion exchange membrane may comprise, for example, a proton exchange membrane. Some embodiments of the invention provide electrochemical cell layers which have a plurality of individual unit cells formed on a sheet of ion exchange membrane material.

18 Claims, 14 Drawing Sheets

(56) References Cited

U.S. PATENT DOCUMENTS

| | | | |
|---|---|---|---|
| 4,756,958 A | 7/1988 | Bryant et al. |
| 5,160,627 A | 11/1992 | Cussler et al. |
| 5,171,646 A | 12/1992 | Rohr |
| 5,190,834 A | 3/1993 | Kendall |
| 5,310,765 A | 5/1994 | Banerjee et al. |
| 5,364,711 A | 11/1994 | Yamada et al. |
| 5,432,023 A | 7/1995 | Yamada et al. |
| 5,468,574 A | 11/1995 | Ehrenberg et al. |
| 5,547,551 A | 8/1996 | Bahar et al. |
| 5,587,253 A | 12/1996 | Gozdz et al. |
| 5,599,614 A | 2/1997 | Bahar et al. |
| 5,635,041 A | 6/1997 | Bahar et al. |
| 5,679,482 A | 10/1997 | Ehrenberg et al. |
| 5,709,961 A | 1/1998 | Cisar et al. |
| 5,783,324 A | 7/1998 | Binder et al. |
| 5,853,916 A | 12/1998 | Venugopal et al. |
| 5,861,221 A | 1/1999 | Ledjeff et al. |
| 5,863,672 A | 1/1999 | Ledjeff et al. |
| 5,925,477 A | 7/1999 | Ledjeff et al. |
| 5,952,118 A | 9/1999 | Ledjeff et al. |
| 5,989,741 A * | 11/1999 | Bloomfield et al. .......... 429/465 |
| 6,127,058 A | 10/2000 | Pratt et al. |
| 6,131,851 A | 10/2000 | Williams |
| 6,514,362 B1 | 2/2003 | Zuckerman et al. |
| 6,544,400 B2 | 4/2003 | Hockaday et al. |
| 6,551,745 B2 | 4/2003 | Moutsios et al. |
| 6,579,643 B1 | 6/2003 | Gozdz |
| 6,582,847 B1 | 6/2003 | Bruck et al. |
| 6,613,203 B1 | 9/2003 | Hobson et al. |
| 6,627,673 B2 | 9/2003 | Topolkaraev et al. |
| 6,641,862 B1 | 11/2003 | Grot |
| 6,680,139 B2 | 1/2004 | Narayanan et al. |
| 6,699,611 B2 | 3/2004 | Kim et al. |
| 6,813,203 B2 | 11/2004 | Nakagawa |
| 6,815,121 B2 | 11/2004 | Dasgupta et al. |
| 6,933,077 B2 * | 8/2005 | Sudano et al. ................ 429/208 |
| 7,078,361 B2 | 7/2006 | Cisar et al. |
| 7,117,732 B2 | 10/2006 | Curello et al. |
| 7,118,826 B2 | 10/2006 | O'Neil et al. |
| 7,132,192 B2 | 11/2006 | Muthuswamy et al. |
| 7,147,271 B2 | 12/2006 | Aase et al. |
| 7,153,601 B2 | 12/2006 | Mardilovich et al. |
| 7,223,491 B2 | 5/2007 | McLean et al. |
| 7,226,646 B2 | 6/2007 | McLean et al. |
| 7,229,564 B2 | 6/2007 | Liu et al. |
| 7,314,677 B2 | 1/2008 | Mosdale |
| 7,323,266 B2 | 1/2008 | Morishima et al. |
| 7,341,800 B2 | 3/2008 | Sasahara et al. |
| 7,378,176 B2 | 5/2008 | McLean et al. |
| 7,410,720 B2 | 8/2008 | Yoshitake et al. |
| 7,474,075 B2 | 1/2009 | McLean |
| 7,604,887 B2 | 10/2009 | Mino et al. |
| 7,632,587 B2 | 12/2009 | Mclean et al. |
| RE41,163 E | 3/2010 | Ngo et al. |
| 7,858,261 B2 | 12/2010 | Schaevitz et al. |
| 7,858,262 B2 | 12/2010 | Faucheux et al. |
| 8,080,325 B2 | 12/2011 | McLean et al. |
| 8,173,326 B2 | 5/2012 | Lundblad et al. |
| 8,232,025 B2 | 7/2012 | McLean et al. |
| 8,551,637 B2 | 10/2013 | McLean et al. |
| 8,628,890 B2 | 1/2014 | McLean et al. |
| 2002/0182464 A1 | 12/2002 | Kim et al. |
| 2003/0049516 A1 | 3/2003 | Twu et al. |
| 2003/0077496 A1 | 4/2003 | Keegan et al. |
| 2003/0082425 A1 | 5/2003 | Leban |
| 2003/0082435 A1 | 5/2003 | Muthuswamy et al. |
| 2003/0104273 A1 | 6/2003 | Lee et al. |
| 2003/0152817 A1 | 8/2003 | Sato et al. |
| 2003/0162076 A1 | 8/2003 | Kubota |
| 2003/0175569 A1 | 9/2003 | Inagaki et al. |
| 2003/0180594 A1 | 9/2003 | Choi et al. |
| 2003/0194598 A1 | 10/2003 | Chan |
| 2003/0215719 A1 | 11/2003 | Navarrini et al. |
| 2004/0023096 A1 | 2/2004 | Pratt et al. |
| 2004/0053100 A1 | 3/2004 | Stanley et al. |
| 2004/0062965 A1 | 4/2004 | Morse et al. |
| 2004/0071865 A1 | 4/2004 | Mosdale et al. |
| 2004/0072046 A1 | 4/2004 | Schmidt |
| 2004/0081878 A1 | 4/2004 | Mardilovich et al. |
| 2004/0142229 A1 | 7/2004 | Herman et al. |
| 2004/0175626 A1 | 9/2004 | Dasgupta et al. |
| 2004/0209136 A1 | 10/2004 | Ren et al. |
| 2004/0224190 A1 | 11/2004 | Sasahara et al. |
| 2005/0058887 A1 | 3/2005 | Richards et al. |
| 2005/0118469 A1 | 6/2005 | Leach et al. |
| 2005/0142410 A1 | 6/2005 | Higashi et al. |
| 2005/0181250 A1 | 8/2005 | Beckmann et al. |
| 2005/0202291 A1 | 9/2005 | Schweizer |
| 2005/0249994 A1 | 11/2005 | McLean et al. |
| 2005/0250004 A1 | 11/2005 | McLean et al. |
| 2005/0260478 A1 | 11/2005 | Mino et al. |
| 2006/0127734 A1 | 6/2006 | McLean et al. |
| 2006/0202508 A1 | 9/2006 | Aase et al. |
| 2006/0228606 A1 | 10/2006 | Fiebig et al. |
| 2006/0286422 A1 | 12/2006 | Nakato |
| 2007/0090786 A1 | 4/2007 | McLean |
| 2007/0134531 A1 | 6/2007 | Kimura et al. |
| 2007/0166590 A1 | 7/2007 | Nakano et al. |
| 2007/0184330 A1 | 8/2007 | McLean et al. |
| 2008/0008912 A1 | 1/2008 | Herman et al. |
| 2008/0220210 A1 | 9/2008 | McLean et al. |
| 2008/0233446 A1 | 9/2008 | Zimmermann et al. |
| 2008/0233454 A1 | 9/2008 | Capron et al. |
| 2008/0241607 A1 | 10/2008 | Owejan et al. |
| 2008/0248352 A1 | 10/2008 | McLean et al. |
| 2008/0311458 A1 | 12/2008 | Schrooten et al. |
| 2009/0081493 A1 | 3/2009 | Schrooten et al. |
| 2009/0081523 A1 | 3/2009 | Stukas et al. |
| 2009/0191435 A1 | 7/2009 | McLean et al. |
| 2010/0035110 A1 | 2/2010 | Lundblad |
| 2010/0183955 A1 | 7/2010 | McLean et al. |
| 2011/0003229 A1 | 1/2011 | Schrooten et al. |
| 2011/0274959 A1* | 11/2011 | Bailey et al. .................. 429/124 |
| 2012/0058408 A1 | 3/2012 | McLean |
| 2012/0270132 A1 | 10/2012 | McLean et al. |

FOREIGN PATENT DOCUMENTS

| | | |
|---|---|---|
| CA | 2408588 | 12/2001 |
| CA | 2408588 A | 12/2001 |
| CA | 2408538 | 11/2002 |
| CA | 2408538 A | 11/2002 |
| CA | 2473491 A | 8/2003 |
| CA | 2479000 A | 9/2003 |
| CA | 2498794 A1 | 3/2004 |
| CA | 2446121 A | 4/2004 |
| CA | 2446121 A1 | 4/2004 |
| CA | 2565244 C | 8/2012 |
| CN | 1461070 A | 12/2003 |
| CN | 102208664 A | 10/2011 |
| CN | 101919094 B | 7/2013 |
| CN | 102208664 B | 8/2013 |
| CN | 101981734 B | 11/2013 |
| EP | 0763070 B1 | 3/1997 |
| EP | 1202365 A1 | 5/2002 |
| EP | 1349227 A2 | 1/2003 |
| EP | 1294039 A1 | 3/2003 |
| EP | 1345280 A1 | 9/2003 |
| EP | 2245686 B1 | 4/2013 |
| GB | 1091303 A | 11/1967 |
| HK | 1102014 B | 1/2012 |
| JP | 60-58220 | 4/1985 |
| JP | 60058220 A | 4/1985 |
| JP | 4249867 A | 9/1992 |
| JP | 10510390 A | 10/1998 |
| JP | 2001514431 A | 9/2001 |
| JP | 2001319664 A | 11/2001 |
| JP | 2001319665 A | 11/2001 |
| JP | 2002141084 A | 5/2002 |
| JP | 2003123792 A | 4/2003 |
| JP | 2003297395 A | 10/2003 |
| JP | 2004152761 A | 5/2004 |
| JP | 2004517446 A | 6/2004 |
| JP | 2004523063 A | 7/2004 |

(56) References Cited

FOREIGN PATENT DOCUMENTS

| | | |
|---|---|---|
| JP | 2005116185 A | 4/2005 |
| JP | 2005190752 A | 7/2005 |
| JP | 2005264389 A | 9/2005 |
| JP | 2006127852 A | 5/2006 |
| JP | 2006252785 | 9/2006 |
| JP | 2006252785 A | 9/2006 |
| JP | 2006522446 A | 9/2006 |
| JP | 2006331927 A | 12/2006 |
| JP | 2007536713 A | 12/2007 |
| JP | 2008041371 | 2/2008 |
| JP | 2008060044 A | 3/2008 |
| JP | 2008091291 A | 4/2008 |
| JP | 2008108465 A | 5/2008 |
| JP | 2008544473 A | 12/2008 |
| JP | 2009505363 A | 2/2009 |
| JP | 2011510437 A | 3/2011 |
| JP | 5113517 B2 | 1/2013 |
| KR | 1019970703384 | 7/1997 |
| KR | 1020040033038 | 4/2004 |
| KR | 20100060008 A | 6/2010 |
| KR | 20100110872 A | 10/2010 |
| KR | 20100137489 A | 12/2010 |
| KR | 101182136 B1 | 9/2012 |
| SG | 160085 | 9/2012 |
| SG | 163047 | 1/2013 |
| WO | WO-9532236 A1 | 11/1995 |
| WO | WO-9741168 A1 | 11/1997 |
| WO | WO-9910165 A1 | 3/1999 |
| WO | WO-9967447 A1 | 12/1999 |
| WO | WO-0174710 A1 | 10/2001 |
| WO | WO-2004019439 A1 | 3/2004 |
| WO | WO-2005045972 A1 | 5/2005 |
| WO | WO-2005106078 A1 | 11/2005 |
| WO | WO-2007000593 A2 | 1/2007 |
| WO | WO-2007020242 A1 | 2/2007 |
| WO | WO-2007079580 A1 | 7/2007 |
| WO | WO-2007105291 A1 | 9/2007 |
| WO | WO-2007110956 A1 | 10/2007 |
| WO | WO-2008024401 | 2/2008 |
| WO | WO-2009039654 A1 | 4/2009 |
| WO | WO-2009039656 A1 | 4/2009 |
| WO | WO-2009089634 A1 | 7/2009 |
| WO | WO-2009105896 A1 | 9/2009 |
| WO | WO-2009089634 A8 | 10/2009 |

OTHER PUBLICATIONS

U.S. Appl. No. 11/047,558, Final Office Action mailed Jun. 16, 2006, 15 pgs.
U.S. Appl. No. 11/047,558, Non-Final Office Action mailed Jan. 22, 2007, 6 pgs.
U.S. Appl. No. 11/047,558, Non-Final Office Action mailed Nov. 28, 2005, 14 pgs.
U.S. Appl. No. 11/047,558, Notice of Allowance mailed Jan. 24, 2008, 4 pgs.
U.S. Appl. No. 11/047,558, Notice of Allowance mailed Oct. 3, 2007, 3 pgs.
U.S. Appl. No. 11/047,558, Notice of Non-Compliant Amendment mailed Jun. 28, 2007, 2 pgs.
U.S. Appl. No. 11/047,558, Response filed Mar. 28, 2006 to Non-Final Office Action mailed Nov. 28, 2005, 12 pgs.
U.S. Appl. No. 11/047,558, Response filed Apr. 20, 2007 to Non-Final Office Action mailed Jan. 22, 2007, 11 pgs.
U.S. Appl. No. 11/047,558, Response filed Jul. 27, 2007 to Non-Final Office Action mailed Jan. 22, 2007, 11 pgs.
U.S. Appl. No. 11/047,558, Response filed Sep. 20, 2005 to Restriction Requirement mailed Aug. 23, 2005, 1 pg.
U.S. Appl. No. 11/047,558, Response filed Nov. 15, 2006 to Final Office Action mailed Jun. 16, 2006, 14 pgs.
U.S. Appl. No. 11/047,558, Restriction Requirement mailed Aug. 23, 2005, 6 pgs.
U.S. Appl. No. 11/047,560, Examiner Interview Summary mailed Feb. 23, 2007, 3 pgs.
U.S. Appl. No. 11/047,560, Examiner Interview Summary mailed Oct. 17, 2006, 2 pgs.
U.S. Appl. No. 11/047,560, Non-Final Office Action mailed May 3, 2006, 12 pgs.
U.S. Appl. No. 11/047,560, Non-Final Office Action mailed Jun. 15, 2007, 12 pgs.
U.S. Appl. No. 11/047,560, Non-Final Office Action mailed Nov. 2, 2006, 15 pgs.
U.S. Appl. No. 11/047,560, Non-Final Office Action mailed Dec. 24, 2008, 12 pgs.
U.S. Appl. No. 11/047,560, Notice of Allowance mailed Jul. 28, 2009, 4 pgs.
U.S. Appl. No. 11/047,560, Notice of Allowance mailed Sep. 26, 2008, 4 pgs.
U.S. Appl. No. 11/047,560, Response filed Feb. 8, 2006 to Restriction Requirement mailed Jan. 9, 2006, 2 pgs.
U.S. Appl. No. 11/047,560, Response filed Mar. 2, 2007 to Non-Final Office Action mailed Nov. 2, 2006, 15 pgs.
U.S. Appl. No. 11/047,560, Response filed Mar. 24, 2009 to Non Final Office Action mailed Dec. 24, 2008, 11 pgs.
U.S. Appl. No. 11/047,560, Response filed Aug. 3, 2006 to Non-Final Office Action mailed May 3, 2006, 15 pgs.
U.S. Appl. No. 11/047,560, Response filed Sep. 17, 2007 to Non-Final Action mailed Jun. 15, 2007, 6 pgs.
U.S. Appl. No. 11/047,560, Response filed Nov. 8, 2005 to Restriction Requirement mailed Aug. 23, 2005, 2 pgs.
U.S. Appl. No. 11/047,560, Restriction Requirement mailed Jan. 9, 2006, 5 pgs.
U.S. Appl. No. 11/047,560, Restriction Requirement mailed Aug. 23, 2005, 5 pgs.
U.S. Appl. No. 11/290,646, Non-Final Office Action mailed Jun. 15, 2006, 13 pgs.
U.S. Appl. No. 11/290,646, Notice of Allowance mailed Feb. 22, 2007, 4 pgs.
U.S. Appl. No. 11/290,646, Response filed Nov. 15, 2006 to Non-Final Office Action mailed Jun. 15, 2006, 8 pgs.
U.S. Appl. No. 11/290,647, Examiner Interview Summary mailed Oct. 17, 2006, 2 pgs.
U.S. Appl. No. 11/290,647, Non-Final Office mailed Jun. 15, 2006, 9 pgs.
U.S. Appl. No. 11/290,647, Notice of Allowance Jan. 26, 2007, 4 pgs.
U.S. Appl. No. 11/290,647, Response filed Nov. 15, 2006 to Non-Final Office mailed Jun. 15, 2006, 9 pgs.
U.S. Appl. No. 12/126,811, Final Office Action mailed Aug. 3, 2011, 14 pgs.
U.S. Appl. No. 12/126,811, Non Final Office Action mailed Dec. 23, 2010, 16 pgs.
U.S. Appl. No. 12/126,811, Notice of Allowance mailed Mar. 21, 2013, 9 pgs.
U.S. Appl. No. 12/126,811, Preliminary Amendment filed Jun. 2, 2008, 10 pgs.
U.S. Appl. No. 12/126,811, Response filed Nov. 15, 2011 to Final Office Action mailed Aug. 3, 2011, 14 pgs.
U.S. Appl. No. 12/126,811, Response filed May 16, 2011 to Non Final Office Action mailed Dec. 23, 2010, 13 pgs.
U.S. Appl. No. 12/207,483, Notice of Allowance mailed Mar. 24, 2009, 7 pgs.
U.S. Appl. No. 12/238,040 , Response filed Sep. 1, 2011 to Non Final Office Action mailed Jul. 20, 2011, 17 pgs.
U.S. Appl. No. 12/238,040 , Response filed Nov. 29, 2011 to Final Office Action mailed Oct. 12, 2011, 13 pgs.
U.S. Appl. No. 12/238,040, Final Office Action mailed Oct. 12, 2011, 21 pgs.
U.S. Appl. No. 12/238,040, Non Final Office Action mailed Jul. 20, 2011, 17 pgs.
U.S. Appl. No. 12/238,040, Non Final Office Action mailed Nov. 12, 2013, 30 pgs.
U.S. Appl. No. 12/238,241, Examiner Interview Summary mailed Apr. 11, 2013, 3 pgs.
U.S. Appl. No. 12/238,241, Examiner Interview Summary mailed Oct. 21, 2013, 4 pgs.
U.S. Appl. No. 12/238,241, Final Office Action mailed Apr. 10, 2012, 14 pgs.

(56) References Cited

OTHER PUBLICATIONS

U.S. Appl. No. 12/238,241, Final Office Action mailed Jul. 17, 2013, 13 pgs.
U.S. Appl. No. 12/238,241, Non Final Office Action mailed Nov. 25, 2011, 11 pgs.
U.S. Appl. No. 12/238,241, Non Final Office Action mailed Dec. 17, 2012, 17 pgs.
U.S. Appl. No. 12/238,241, Response filed Feb. 24, 2012 to Non Final Office Action mailed Nov. 25, 2011, 14 pgs.
U.S. Appl. No. 12/238,241, Response filed Apr. 17, 2013 to Non Final Office Action mailed Dec. 17, 2012, 16 pgs.
U.S. Appl. No. 12/238,241, Response filed Aug. 10, 2012 to Final Office Action mailed Apr. 10, 2012, 8 pgs.
U.S. Appl. No. 12/238,241, Response filed Aug. 19, 2011 to Restriction Requirement mailed Jul. 19, 2011, 6 pgs.
U.S. Appl. No. 12/238,241, Response filed Dec. 17, 2013 to Final Office Action mailed Jul. 17, 2013, 14 pgs.
U.S. Appl. No. 12/238,241, Restriction Requirement mailed Jul. 19, 2011, 6 pgs.
U.S. Appl. No. 12/355,564, Notice of Allowance mailed Oct. 11, 2011, 9 pgs.
U.S. Appl. No. 12/637,422, Non Final Office Action mailed Feb. 2, 2011, 10 pgs.
U.S. Appl. No. 12/637,422, Notice of Allowance mailed Jan. 24, 2012, 9 pgs.
U.S. Appl. No. 12/637,422, Notice of Allowance mailed Apr. 2, 2012, 9 pgs.
U.S. Appl. No. 12/637,422, Response filed Aug. 2, 2011 to Non Final Office Action mailed Feb. 2, 2011, 12 pgs.
U.S. Appl. No. 12/920,064, Non Final Office Action mailed Aug. 2, 2013, 10 pgs.
U.S. Appl. No. 12/920,064, Preliminary Amendment filed Aug. 27, 2010, 7 pgs.
U.S. Appl. No. 12/920,064, Response filed Feb. 21, 2013 to Restriction Requirement mailed Jan. 23, 2013, 8 pgs.
U.S. Appl. No. 12/920,064, Response filed Jun. 10, 2013 to Restriction Requirement mailed May 22, 2013, 7 pgs.
U.S. Appl. No. 12/920,064, Response filed Oct. 21, 2013 to Non Final Office Action mailed Aug. 2, 2013, 10 pgs.
U.S. Appl. No. 12/920,064, Restriction Requirement mailed Jan. 23, 2013, 7 pgs.
U.S. Appl. No. 12/920,064, Restriction Requirement mailed May 22, 2013, 7 pgs.
U.S. Appl. No. 13/293,666, Final Office Action mailed Oct. 30, 2013, 13 pgs.
U.S. Appl. No. 13/293,666, Non Final Office Action mailed May 2, 2013, 13 pgs.
U.S. Appl. No. 13/293,666, Response filed Jul. 29, 2013 to Non Final Office Action mailed May 2, 2013, 9 pgs.
U.S. Appl. No. 13/535,880, Non Final Office Action mailed Mar. 14, 2013, 10 pgs.
U.S. Appl. No. 13/535,880, Notice of Allowance mailed Aug. 27, 2013, 8 pgs.
U.S. Appl. No. 13/535,880, Response filed Jan. 15, 2013 to Restriction Requirement mailed Nov. 26, 2012, 7 pgs.
U.S. Appl. No. 13/535,880, Response filed Jun. 11, 2013 to Non Final Office Action mailed Mar. 14, 2013, 9 pgs.
U.S. Appl. No. 13/535,880, Restriction Requirement mailed Nov. 26, 2012, 6 pgs.
Canadian Application Serial No. 2,564,843, Amendment filed Nov. 4, 2011 in response to Office Action mailed Jun. 22, 2011, 4 pgs.
Canadian Application Serial No. 2,564,843, Office Action mailed Feb. 27, 2012, 2 pgs.
Canadian Application Serial No. 2,564,843, Office Action mailed Jun. 22, 2011, 3 pgs.
Canadian Application Serial No. 2,564,843, Office Action mailed Nov. 21, 2012, 2 pgs.
Canadian Application Serial No. 2,564,843, Response filed Feb. 6, 2013 to Office Action mailed Nov. 21, 2012, 3 pgs.
Canadian Application Serial No. 2,565,244, Examiners Report mailed Jun. 8, 2011, 3 pgs.
Canadian Application Serial No. 2,565,244, Reponse filed Nov. 22, 2011 to Examiner's Report mailed Jun. 8, 2011, 7 pgs.
Chinese Application Serial No. 200580018092.5, Response filed Apr. 15, 2009 to Office Action mailed Feb. 6, 2009, Chinese only, 8 pgs.
Chinese Application Serial No. 200580018092.5, Response filed Nov. 4, 2009 to Third Office Action dated Jun. 19, 2009, (w/ English Translation of Amended Claims), 14 pgs.
Chinese Application Serial No. 200580018092.5, Fourth Office Action mailed Dec. 4, 2009, (w/ English Translation), 21 pgs.
Chinese Application Serial No. 200580018092.5, Response filed Apr. 14, 2010 to Fourth Office Action mailed Dec. 4, 2009, Chinese only, 7 pgs.
Chinese Application Serial No. 200580018092.5, Second Office Action mailed Feb. 6, 2009, (w/ English Translation), 13 pgs.
Chinese Application Serial No. 200580018092.5, Third Office Action dated Jun. 19, 2009, (w/ English Translation), 33 pgs.
Chinese Application Serial No. 200580018178.8, Office Action mailed May 8, 2009, 8 pgs.
Chinese Application Serial No. 200580018178.8, Response filed Oct. 15, 2010 to Office Action mailled Jun. 11, 2010, 6 pgs.
Chinese Application Serial No. 200580018178.8, Response filed Nov. 23, 2009 to Office Action dated May 8, 2009, 7 pgs.
Chinese Application Serial No. 200580018178.8, Second Office Action mailed Jun. 11, 2010, (English Translation), 10 pgs.
Chinese Application Serial No. 200880112997.2, Office Action mailed Mar. 13, 2013, w/English translation, 11 pgs.
Chinese Application Serial No. 200880112997.2, Office Action mailed Jul. 23, 2012, (w/ English Translation), 8 pgs.
Chinese Application Serial No. 200880112997.2, Office Action mailed Aug. 22, 2013, w/English translation, 13 pgs.
Chinese Application Serial No. 200880112997.2, Response filed May 20, 2013 to Office Action mailed Mar. 13, 2013, w/English translation of amended claims, 8 pgs.
Chinese Application Serial No. 200880112997.2, Response filed Sep. 6, 2013 to Office Action mailed Aug. 22, 2013, 2 pgs.
Chinese Application Serial No. 200880112997.2, Response filed Dec. 7, 2012 to Office Action mailed Jul. 23, 2012, (w/ English Translation), 8 pgs.
Chinese Application Serial No. 200880114733.0, Office Action mailed Feb. 20, 2013, w/English translation, 15 pgs.
Chinese Application Serial No. 200880114733.0, Office Action mailed Jul. 13, 2012, w/English translation, 8 pgs.
Chinese Application Serial No. 200880114733.0, Office Action mailed Aug. 14, 2013, w/English translation, 9 pgs.
Chinese Application Serial No. 200880114733.0, Response filed Oct. 21, 2013 to Office Action mailed Aug. 14, 2013, w/English translation, 7 pgs.
Chinese Application Serial No. 200880114733.0, Response filed Nov. 23, 2012 to Office Action mailed Jul. 13, 2012, (w/ English Translation of Amended Claims), 9 pgs.
Chinese Application Serial No. 200880114733.0, Response filed May 7, 2013 to Office Action mailed Feb. 20, 2013, w/English translation, 9 pgs.
Chinese Application Serial No. 200980102519.8, Office Action mailed Sep. 17, 2012, (w/ English Translation), 18 pgs.
Chinese Application Serial No. 200980102519.8, Response filed Jan. 22, 2013 to Office Action mailed Sep. 17, 2012, w/English claims, 14 pgs.
Chinese Application Serial No. 200980110830.7, Office Action mailed Dec. 20, 2012, Chinese only, 5 pgs.
Chinese Application Serial No. 200980110830.7, Response filed Mar. 28, 2013 to Office Action mailed Dec. 20, 2012, w/English translation, 11 pgs.
Chinese Application Serial No. 201110109407.4, Office Action mailed Jan. 12, 2012, With English Translation, 7 pgs.
Chinese Application Serial No. 201110109407.4, Office Action mailed Oct. 8, 2012, (w/ English Translation), 15 pgs.
Chinese Application Serial No. 201110109407.4, Response filed Feb. 22, 2013 to Office Action mailed Oct. 8, 2012, w/English translation, 13 pgs.

(56) References Cited

OTHER PUBLICATIONS

Chinese Application Serial No. 201110109407.4, Response filed May 28, 2012 to Office Action mailed Jan. 12, 2012, CN Translation Only, 7 pgs.
European Application Serial No. 05741066.4, Response filed Oct. 5, 2012 to Office Action mailed May 2, 2012, 30 pgs.
European Application Serial No. 05741066.4, Office Action mailed Feb. 5, 2009, 4 pgs.
European Application Serial No. 05741066.4, Office Action mailed May 2, 2012, 5 pgs.
European Application Serial No. 05741066.4, Office Action mailed Sep. 1, 2011, 5 pgs.
European Application Serial No. 05741066.4, Office Action mailed Nov. 13, 2012, 5 pgs.
European Application Serial No. 05741066.4, Response filed Mar. 12, 2012 to Office Action mailed Sep. 1, 2011, 21 pgs.
European Application Serial No. 05741066.4, Response filed May 10, 2013 to Examination Notification Art. 94(3) mailed Nov. 13, 2012, 67 pgs.
European Application Serial No. 05741066.4, Response filed Jun. 12, 2009 to Communication dated Feb. 5, 2009, 25 pgs.
European Application Serial No. 05741066.4, Supplementary European Search Report mailed May 2, 2008, 3 pgs.
European Application Serial No. 05741083.9, Examination Notification Art. 94(3) mailed Jun. 20, 2013, 5 pgs.
European Application Serial No. 05741083.9, Response filed Dec. 15, 2011 to Office Action mailed Aug. 12, 2011, 18 pgs.
European Application Serial No. 05741083.9, Supplementary European Search Report mailed Mar. 2, 2009, 4 pgs.
European Application Serial No. 08800398.3, Extended Search Report mailed Nov. 7, 2012, 7 pgs.
European Application Serial No. 08800398.3, Response filed May 28, 2013 to Extended European Search Report mailed Nov. 7, 2012, 21 pgs.
European Application Serial No. 08800400.7, Response filed Jan. 28, 2013 to Supplementary European Search Report mailed Jun. 29, 2012, 18 pgs.
European Application Serial No. 08800400.7, Supplementary European Search Report mailed Jun. 29, 2012, 7 pgs.
European Application Serial No. 09702708.0, Supplementary European Search Report mailed Nov. 25, 2011, 14 pgs.
European Application Serial No. 09714121.2, European Search Report mailed Aug. 3, 2012, 9 pgs.
European Application Serial No. 09714121.2, Response filed Feb. 27, 2013 to Extended European Search Report mailed Aug. 3, 2012, 18 pgs.
European Application Serial No. 11001213.5, Amendment filed Dec. 6, 2012, 15 pgs.
European Application Serial No. 11001213.5, Examination Notification Art. 94(3) mailed Jan. 16, 2013, 5 pgs.
European Application Serial No. 11001213.5, Extended European Search Report mailed May 7, 2012, 15 pgs.
European Application Serial No. 11001213.5, Office Action mailed Aug. 30, 2011, 5 pgs.
European Application Serial No. 11001213.5, Partial European Search Report mailed Jan. 30, 2012, 8 pgs.
European Application Serial No. 11001213.5, Response filed Jul. 23, 2013 to Office Action mailed Jan. 16, 2013, 23 pgs.
European Application Serial No. 11001213.5, Response filed Nov. 9, 2011 to Office Action mailed Aug. 30, 2011, 10 pgs.
European Application Serial No. 12161876.3, Extended European Search Report mailed Jul. 13, 2012, 13 pgs.
European Application Serial No. 12161876.3, Response filed Feb. 15, 2013 to Extended European Search Report mailed Jul. 13, 2012, 16 pgs.
European Application Serial No. 5741066.4, Examination Notification Art. 94(3) mailed Jul. 1, 2013, 6 pgs.
European Application Serial No. 5741066.4, Response filed Sep. 10, 2013 to Examination Notification Art. 94(3) mailed Jul. 1, 2013, 8 pgs.
European Application Serial No. 05741083.9, Office Action dated Aug. 12, 2011, 5 pages.
European Application Serial No. 05741083.9, Office Action mailed Mar. 19, 2010, 9 pgs.
European Application Serial No. 05741083.9, Response filed Sep. 29, 2010 to Office Action mailed Mar. 19, 2010, 16 pgs.
Indian Application Serial No. 1294/MUMNP/2006, First Examination Report mailed Jan. 18, 2012, 1 pg.
Indian Application Serial No. 1294/MUMNP/2006, Hearing Notice dated Oct. 18, 2012, 2 pgs.
Indian Application Serial No. 1294/MUMNP/2006, Written Submission filed Nov. 15, 2012 in Response to Hearing Notice dated Oct. 18, 2012, 22 pgs.
Indian Application Serial No. 1295/MUMNP/2006, First Examination Report mailed Jan. 11, 2012, 2 pgs.
Indian Application Serial No. 1295/MUMNP/2006, Response filed Jan. 10, 2013 from Office Action mailed Jan. 11, 2012, 16 pgs.
Indian Application Serial No. 4949/CHENP/2010, Voluntary Amendment filed Jan. 13, 2012, 15 pgs.
Indian Application Serial No. 6846/DELNP/2010, Request for Examination filed Feb. 23, 2012, 13 pgs.
International Application Serial No. PCT/CA2005/000663, International Preliminary Report on Patentability dated Nov. 7, 2006, 7 pgs.
International Application Serial No. PCT/CA2005/000663, International Search Report mailed Aug. 30, 2005, 2 pgs.
International Application Serial No. PCT/CA2005/000663, Written Opinion mailed Aug. 30, 2005, 6 pgs.
International Application Serial No. PCT/CA2005/000669, International Search Report mailed Aug. 18, 2005, 2 pgs.
International Application Serial No. PCT/CA2005/000669, Written Opinion mailed Aug. 18, 2005, 5 pgs.
International Application Serial No. PCT/CA2008/001711, International Search Report mailed Dec. 12, 2008, 4 pgs.
International Application Serial No. PCT/CA2008/001711, Preliminary Report on Patentability mailed Apr. 8, 2010, 8 pgs.
International Application Serial No. PCT/CA2008/001711, Writen Opinion mailed Dec. 12, 2008, 6 pgs.
International Application Serial No. PCT/CA2008/001713, International Search Report mailed Jan. 5, 2009, 3 pgs.
International Application Serial No. PCT/CA2008/001713, Written Opinion mailed Jan. 5, 2009, 4 pgs.
International Application Serial No. PCT/CA2009/000068, Search Report mailed Apr. 17, 2009, 3 pgs.
International Application Serial No. PCT/CA2009/000068, Written Opinion mailed Apr. 17, 2009, 7 pgs.
International Application Serial No. PCT/CA2009/000253, International Preliminary Report on Patentability dated Aug. 31, 2010, 8 pgs.
International Application Serial No. PCT/CA2009/000253, International Search Report mailed Jun. 12, 2009, 4 pgs.
International Application Serial No. PCT/CA2009/000253, Written Opinion mailed Jun. 12, 2009, 7 pgs.
International Application Serial No. PCT/CA2088/001713, International Preliminary Report on Patentability dated Mar. 30, 2010, 5 pgs.
Japanese Application Serial No. 2007-511797, Office Action mailed Nov. 29, 2011, (w/ English Translation), 7 pgs.
Japanese Application Serial No. 2007-511797, Response filed Feb. 29, 2012 to Office Action mailed Dec. 22, 2011, (w/ English Translation of Amended Claims), 15 pgs.
Japanese Application Serial No. 2007-511799, Office Action mailed Jan. 4, 2012, With English Translation, 8 pgs.
Japanese Application Serial No. 2007-511799, Response filed Jul. 4, 2012 to Office Action mailed Jan. 4, 2012, W/title page in English, 11 pgs.
Japanese Application Serial No. 2010-526121, Examiners Decision of Final Refusal mailed Nov. 5, 2013, 7 pgs.
Japanese Application Serial No. 2010-526121, Office Action mailed Mar. 12, 2013, w/English translation, 9 pgs.
Japanese Application Serial No. 2010-526121, Office Action mailed Jul. 9, 2013, w/English translation, 8 pgs.
Japanese Application Serial No. 2010-526121, Response filed Jun. 7, 2013 to Office Action mailed Mar. 12, 2013, w/English translation, 11 pgs.

(56) References Cited

OTHER PUBLICATIONS

Japanese Application Serial No. 2010-526121, Response filed Oct. 9, 2013 to Office Action mailed Jul. 9, 2013, w/English translation, 9 pgs.
Japanese Application Serial No. 2010-526122, Office Action mailed Apr. 2, 2013, w/English translation, 14 pgs.
Japanese Application Serial No. 2010-526122, Response filed Sep. 26, 2013 to Office Action mailed Apr. 2, 2013, with English claims, 10 pgs.
Japanese Application Serial No. 2010-542489, Office Action mailed May 16, 2013, w/English translation, 8 pgs.
Japanese Application Serial No. 2010-542489, Response filed Jul. 9, 2013 to Office Action mailed May 16, 2013, w/English translation, 13 pgs.
Japanese Application Serial No. 2010-547930, Office Action mailed Apr. 12, 2012, Japanese only, 1 pg.
Japanese Application Serial No. 2010-547930, Response filed Apr. 18, 2012 to Office Action mailed Apr. 12, 2012, Japanese only, 2 pgs.
Japanese Application Serial No. 2010-547930, Voluntary Amendment filed Feb. 24, 2012, (w/ English Translation of Claims), 17 pgs.
Korean Application Serial No. 10-2010-7009043, Amendment filed Sep. 25, 2013, 17 pgs.
Korean Application Serial No. 10-2010-7009044, Amendment filed Sep. 25, 2013, 12 pgs.
Korean Application Serial No. 10-2010-7021778, Amendment filed Feb. 28, 2012, with/Brief Translation, 14 pgs.
Korean Application Serial No. 10-2010-7021778, Office Action mailed Aug. 20, 2013, w/English translation, 15 pgs.
Korean Application Serial No. 2006-7023178, Office Action mailed Sep. 15, 2011, English translation only, 2 pgs.
Korean Application Serial No. 2006-7023178, Office Action Response filed Nov. 10, 2011 to Office Action dated Sep. 15, 2011, Korean only, 7 pgs.
Korean Application Serial No. 2006-7023189, Office Action mailed Nov. 7, 2011, (English Translation), 6 pgs.
Korean Application Serial No. 2006-7023189, Response filed Feb. 7, 2012 to Office Action mailed Nov. 7, 2011, Korean only, 27 pgs.
Machine Translation of JP 2003-123792A, dated Apr. 25, 2003, 21 pgs.
Singapore Application Serial No. 201002054-3, Response filed Sep. 22, 2011 to Office Action mailed Apr. 27, 2011, 6 pgs.
Singapore Application Serial No. 201002064-2, Office Action mailed Jul. 26, 2011, 9 pgs.
Singapore Application Serial No. 201002064-2, Response filed Dec. 22, 2011 to Office Action mailed Jul. 26, 2011, 19 pgs.
Singapore Application Serial No. 201004893-2, Office Action mailed Oct. 27, 2011, 18 pgs.
Singapore Application Serial No. 201004893-2, Voluntary Amendment filed Jan. 2, 2013, 2 pgs.
Singapore Application Serial No. 201004893-2, Written Opinion Response filed Mar. 8, 2012 to Office Action mailed Oct. 27, 2011, 7 pgs.
Singapore Application Serial No. 201002054-3, Office Action mailed Apr. 27, 2011, 8 Pgs.
Singapore Application Serial No. 201006260-2, Amendment filed Mar. 18, 2011, 6 pgs.
Singapore Application Serial No. 201006260-2, Examination Report mailed Oct. 6, 2011, 8 pgs.
Bloomfield, David P., et al., "Electrochemical Cell System With Side-By-Side Arrangement of Cells", (Nov. 23, 1999), 11 pgs.
Ichijo, H., et al., "Separation of Organic Substances with Thermoresponsive Polymer Hydrogel", Polymer Gels and Networks, 2, (1994), 315-322.
Ledjeff, Konstantin, et al., "Battery Shaped as a Membrane Strip Containing Several Cells", (Jan. 19, 1999), 13 pgs.
Lee, Y. M., et al., "Synthesis and swelling characteristics of pH and thermoresponsive interpenetrating polymer network hydrogel composed of poly(vinyl alcohol) and poly(acrylic acid)", Journal of Applied Polymer Science, 62(2), (1996), 301-311.
McLean, G. F., "Flexible Fuel Cell", U.S. Appl. No. 60/975,132, filed Sep. 25, 2007, 20 pgs.
Poulin, Gerard, et al., "Polymer Composite Ionic/Electronic Conductance Membrane Methods for the Production Thereof and a Planar Fuel Cell Core Comprising Said Membrane", (Feb. 22, 2007), 53 pgs.
Schrooten, J., et al., "Electrochemical Cell and Membranes Related Thereto", U.S. Appl. No. 61/025,739, filed Dec. 1, 2009, 27 pgs.
Schrooten, J., et al., "Fluid Manifold and Method Therefor", U.S. Appl. No. 12/053,366, filed Mar. 21, 2008, 37 pgs.
Schrooten, J., et al., "Fuel Cell Systems Including Space-Saving Fluid Plenum and Related Methods", U.S. Appl. No. 12/238,241, filed Sep. 25, 2008, 36 pgs.
U.S. Appl. No. 13/293,666, Response filed May 7, 2014 to Non Final Office Action mailed Feb. 12, 2014, 10 pgs.
U.S. Appl. No. 12/238,241, Notice of Allowance mailed Apr. 2, 2014, 10 pgs.
U.S. Appl. No. 12/920,064, Response filed Feb. 26, 2014 to Restriction Requirement mailed Jan. 29, 2014, 9 pgs.
U.S. Appl. No. 12/920,064, Restriction Requirement mailed Jan. 29, 2014, 8 pgs.
U.S. Appl. No. 13/293,666, Non Final Office Action mailed Feb. 12, 2014, 13 pgs.
U.S. Appl. No. 13/293,666, Response filed Jan. 17, 2014 to Final Office Action mailed Oct. 30, 2013, 8 pgs.
U.S. Appl. No. PCT/CA2005/000669, International Preliminary Report on Patentability mailed Nov. 7, 2006, 6 pgs.
Canadian Application Serial No. 2,564,843, Amendment filed Apr. 28, 2010, 12 pgs.
Canadian Application Serial No. 2,564,843, Response filed Aug. 27, 2012 to Office Action mailed Feb. 27, 2012, 27 pgs.
European Application Serial No. 11001213.5, Examination Notification Art. 94(3) mailed Mar. 28, 2014, 4 pgs.
"Fuel Cell", Wikipedia, [online]. Retrieved from the Internet: <URL: http://en.wikipedia.org/wiki/Fuel_cell>, (Accessed Aug. 27, 2012), 15 pgs.
Japanese Application Serial No. 2010-547930, Office Action mailed Dec. 18, 2013, w/English translation, 8 pgs.
Japanese Application Serial No. 2010-547930, Response filed Mar. 17, 2014 to Office Action mailed Dec. 18, 2013, w/English claims, 17 pgs.
Korean Application Serial No. 10-2010-7021778, Response filed Nov. 20, 2013 to Office Action mailed Aug. 20, 2013, w/English claims, 41 pgs.

* cited by examiner

ELECTROCHEMICAL CELLS HAVING CURRENT-CARRYING STRUCTURES UNDERLYING ELECTROCHEMICAL REACTION LAYERS

REFERENCE TO RELATED APPLICATION

This application is a continuation of U.S. patent application Ser. No. 13/535,880, filed Jun. 28, 2012; which application is a continuation of U.S. patent application Ser. No. 12/637,422, filed Dec. 14, 2009; which application is a continuation of of U.S. patent application Ser. No. 11/047,560 filed on Feb. 2, 2005, now issued as U.S. Pat. No. 7,632,587 on Dec. 15, 2009; which application claims priority to U.S. provisional patent application Ser. No. 60/567,648 filed May 4, 2004 and U.S. provisional patent application Ser. No. 60/608,879, filed on Sep. 13, 2004, which applications are hereby incorporated by reference in their entirety.

BACKGROUND

A conventional electrochemical cell 10 is shown in FIG. 1. Cell 10 may, for example, comprise a PEM (proton exchange membrane) fuel cell. Cell 10 has a manifold 12 into which is introduced a fuel, such as hydrogen gas. The fuel can pass through a porous current-carrying layer 13A into an anode catalyst layer 14A, where the fuel undergoes a chemical reaction to produce free electrons and positively charged ions (typically protons). The free electrons are collected by current-carrying layer 13A, and the ions pass through an electrically-insulating ion exchange membrane 15. Ion exchange membrane 15 lies between anode catalyst layer 14A and a cathode catalyst layer 14B. Cell 10 has a manifold 16 carrying an oxidant (e.g. air or oxygen). The oxidant can pass through a porous current-carrying layer 13B to access cathode catalyst layer 14B.

As shown in FIG. 1A, electrons travel from the sites of chemical reactions in anode catalyst layer 14A to current-carrying layer 13A. Protons (or other positively charged ions) travel into and through ion exchange membrane 15 in a direction opposite to the direction of electron flow. Electrons collected in current-carrying layer 13A travel through an external circuit 18 to the porous current-carrying layer 13B on the cathode side of cell 10. In such cells, electron flow and ion flow occur in generally opposite directions and are both substantially perpendicular to the plane of ion exchange membrane 15.

Catalyst layers 14A and 14B must be "dual species conductive" (i.e. they must provide conductive paths for the flow of both electrons and ions). Ion exchange membrane 15 must be single species conductive (i.e. it must permit ions to flow while providing electrical insulation to avoid internal short-circuiting of cell 10).

Many electrochemical devices include some form of porous conductive reactant diffusion media to carry current away from a catalyst layer. This compromises the ability to transport reactants to the catalyst sites, and introduces a difficult material challenge. Further, there are manufacturing and cost issues associated with the inclusion of reactant diffusion layers. A major problem in designing high performance electrochemical cells is to provide current-carrying layers which permit current to be passed into or withdrawn from the cell while permitting reactants to enter the cell and products of the reactions to be removed from the cell.

Despite the vast amount of fuel cell research and development that has been done over the past decades there remains a need for more efficient electrochemical cells that can be produced cost effectively and which provide improved access for reactants to the electrochemical reaction sites.

SUMMARY OF THE INVENTION

The invention relates to electrochemical cells such as fuel cells or electrolyzers. Some embodiments of the invention have application in electrochemical cells of other types such as those used for chlor-alkali processing. Some embodiments of the invention provide electrochemical cell layers comprising arrays of individual or "unit" cells.

One aspect of the invention provides a thin layer cell structure comprising an ion exchange membrane having an electrochemical reaction layer on each side thereof. The ion exchange membrane may comprise a layer of unitary construction, or may comprise a composite layer made up of more than one material. The ion exchange membrane may comprise, for example, a proton exchange membrane. An electrical current-carrying structure at least in part underlies one of the electrochemical reaction layers.

Another aspect of the invention provides core assemblies for electrochemical cells. A core assembly comprises an ion exchange membrane; an electrically conducting electrochemical reaction layer on at least a first side of the ion exchange membrane; and, an electrically-conductive current-carrying structure in electrical contact with the electrochemical reaction layer. An outer surface of the electrochemical reaction layer overlies at least a portion of the current-carrying structure.

A further aspect of the invention provides methods for operating an electrochemical cell. Such methods comprise providing an electrochemical cell having: a catalyst-containing electrochemical reaction layer having an outer face and an inner face; an electrical current-carrying structure underlying the electrochemical reaction layer at least in part; and an ion-conducting layer in contact with the inner face of the electrochemical reaction layer; allowing a reactant to diffuse into the electrochemical reaction layer; allowing the reactant to undergo a catalyzed electrochemical reaction to produce an ion at a location in the electrochemical reaction layer between a surface of the electrochemical layer and the current-carrying layer; and, allowing the ion to travel to the ion-conducting layer along a path that avoids the current-carrying structure.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

The invention relates to electrochemical cells such as fuel cells or electrolyzers, and may also have application in other types of electrochemical cells, such as those used for chlor-alkali processing. Some embodiments of the invention provide electrochemical cell layers comprising arrays of individual or "unit" cells.

Electrochemical cells according to some embodiments of the invention have a thin layer cell structure wherein an electrical current-carrying structure at least in part underlies an electrochemical reaction layer (referred to herein as a "catalyst layer"). Each cell comprises an ion exchange membrane having a catalyst layer on each side thereof. The ion exchange membrane may comprise, for example, a proton exchange membrane. Certain embodiments of the invention permit construction of an electrochemical cell layer comprising a plurality of individual unit cells formed on a sheet of ion exchange membrane material.

The ion exchange membrane may comprise a layer of unitary construction, or may comprise a composite layer made up of more than one material. Some examples of composite structures are described in the commonly-owned U.S. Pat. No. 7,378,176, issued on May 27, 2008, and entitled "MEMBRANES AND ELECTROCHEMICAL CELLS INCORPORATING SUCH MEMBRANES" which is hereby incorporated by reference herein.

The configuration of the current-carrying structures in preferred embodiments of the invention provides reactants with improved access to the catalyst layer, and permits the construction of electrochemical cells which are thinner than similar prior art electrochemical cells of the type having current-carrying layers positioned on outer surfaces of the catalyst layers. Throughout this description, the terms "inner" and "outer" are respectively used to refer to directions closer to and farther from the center of the ion exchange membrane.

Figure 1:
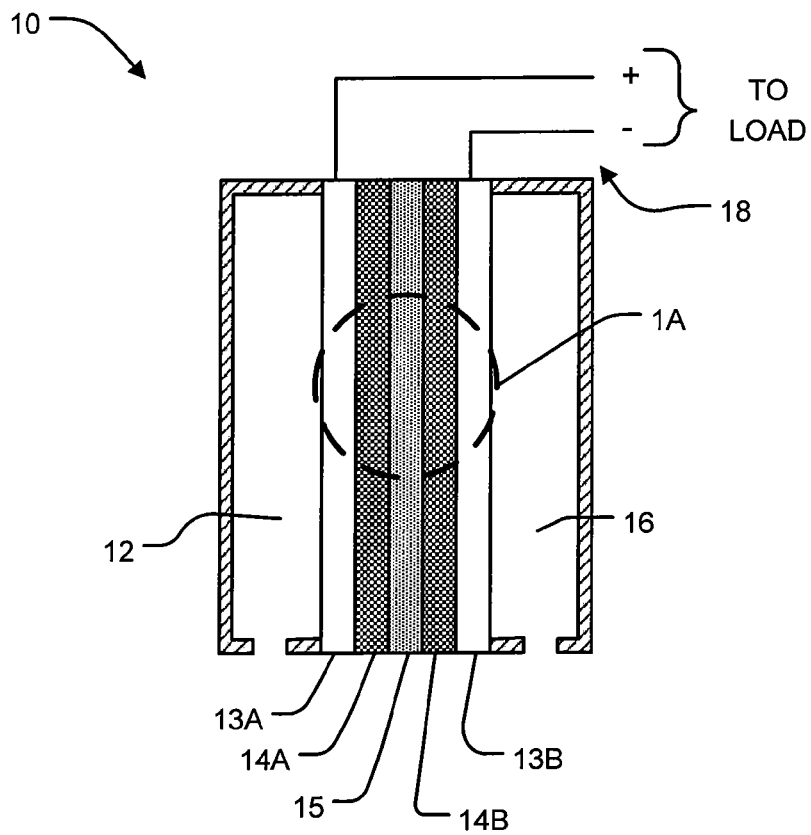
FIG. 1 is a cross-sectional schematic diagram of a prior art electrochemical cell.
Figure 1A:
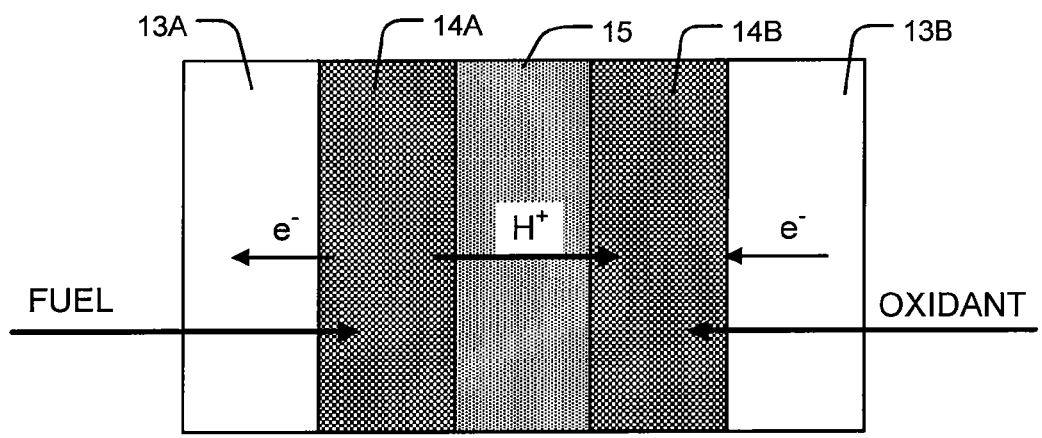
FIG. 1A is an enlarged schematic view of a portion of the cell of FIG. 1.
Figure 2A:
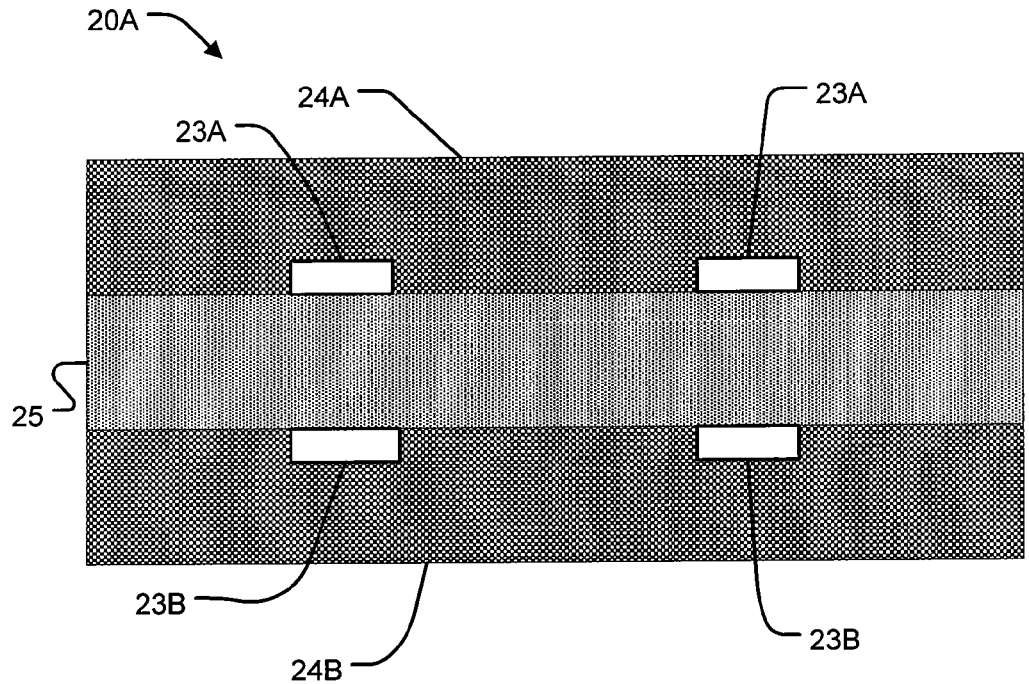
FIGS. 2A-D are schematic views of unit cell structures according to embodiments of the invention.
Figure 2B:
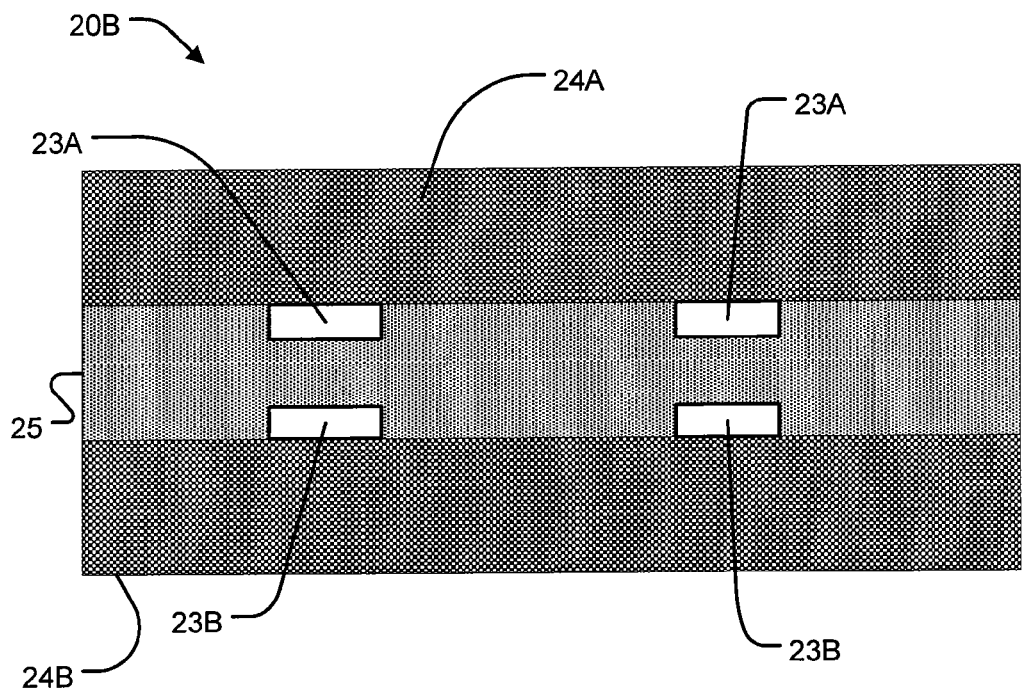

FIGS. 2A and 2B show unit cell structures 20A and 20B according to alternative embodiments of the invention. Structures 20A and 20B are similar to one another, and each comprise current-carrying structures 23A and 23B positioned on opposite sides of an ion exchange membrane 25. Electrochemical reaction layers 24A and 24B are positioned on the outside of current-carrying structures 23A and 23B and ion exchange membrane 25. The difference between structures 20A and 20B is that in structure 20A current-carrying structures 23A and 23B are positioned on the outer surfaces of ion exchange membrane 25, while in structure 20B current-carrying structures 23A and 23B are embedded in the outer surfaces of ion exchange membrane 25.

Figure 2C:
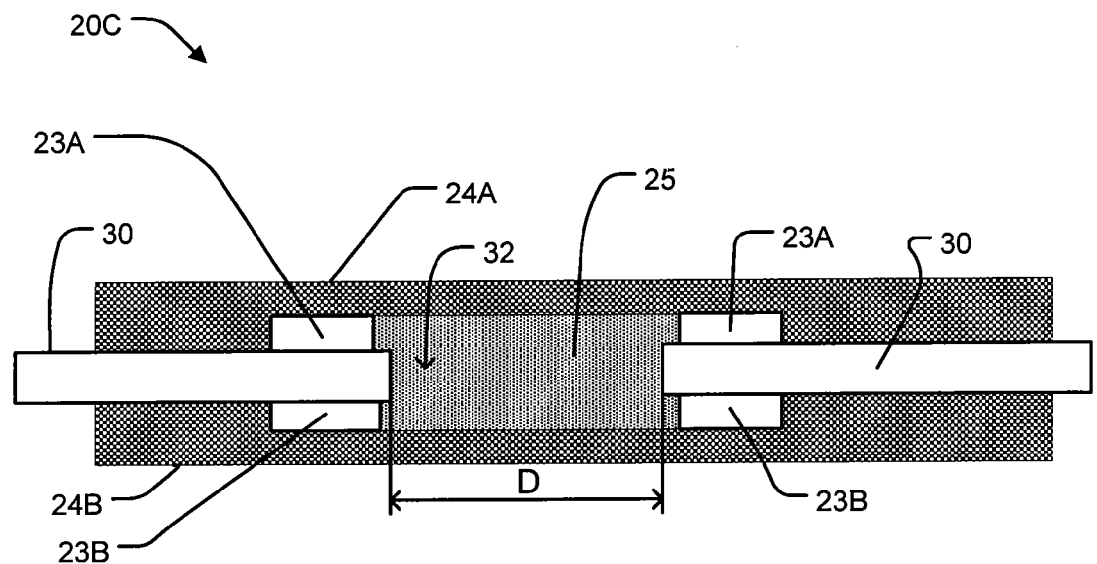
Figure 2D:
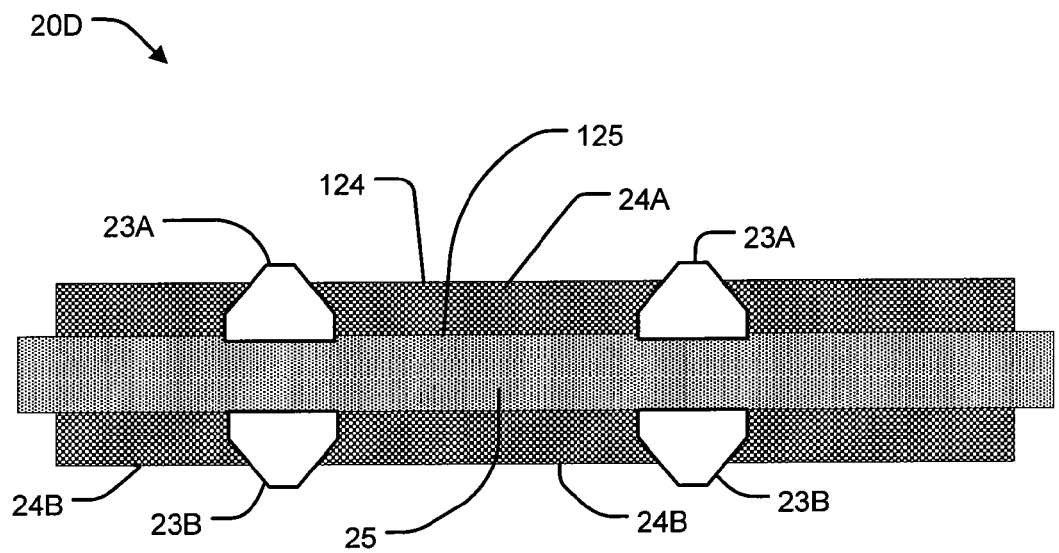

FIGS. 2C and 2D show unit cell structures 20C and 20D according to further alternative embodiments of the invention. In structure 20C, current-carrying structures 23A and 23B are formed on a substrate 30. Substrate 30 is constructed from a non-conducting material.

Substrate 30 is penetrated by an opening 32. Opening 32 is filled with an ion-conducting material. The ion-conducting material may comprise an ionomer or electrolyte suitable to the application. The ion-conducting material may extend outward to the outer edges of current-carrying structures 23A and 23B to form ion exchange membrane 25 of unit cell structure 20C. In the illustrated embodiment, opening 32 is round, but this is not necessary. Opening 32 may be of any suitable shape. In some embodiments, opening 32 is long and narrow. In some embodiments, each unit cell has a plurality of openings 32.

In some embodiments, openings 32 comprise a pattern of openings, which may be microstructured openings, as described, for example in the commonly-assigned U.S. Pat. No. 7,378,176, issued on May 27, 2008 entitled "MEMBRANES AND ELECTROCHEMICAL CELLS INCORPORATING SUCH MEMBRANES" which is referred to above.

Examples of materials that may be suitable for substrate 30 in specific applications include: printed circuit board (PCB) material, polyamide films; polyimide films such as Kapton™, polyethylene films, Teflon™ films, other polymer films, reinforced composite materials such as fiberglass, suitable non-polymer materials such as silicon or glass.

In some applications it is advantageous that substrate 30 be flexible. In such applications it is desirable that substrate 30 be made of a flexible material.

In structure 20D, current-carrying structures 23A and 23B are formed on proton conducting membrane 25 and there is no substrate 30. Structure 20D differs from structure 20A in that current-carrying structures 23A and 23B project respectively through the outer surfaces of catalyst layers 24A and 24B. A structure like structure 20D may have its catalyst layers 24A and 24B divided into isolated areas by current-carrying structures 23A and 23B. Structure 20D has the disadvantage that the exposed surface area of catalyst areas 24A and 24B is somewhat reduced in comparison to structures 20A, 20B, and 20C.

In each of unit cell structures 20A-D, current-carrying structures 23A and 23B underlie portions of catalyst layers 24A and 24B respectively. In the embodiments of FIGS. 2A-C, ions liberated at reaction sites which are over current-carrying structures 23A (or, in FIG. 2C, over substrate 30) are blocked from flowing directly into and through ion exchange membrane 25 by the shortest straight-line path. Ions liberated at such sites must take longer paths to reach catalyst layer 24B. However, by appropriately positioning current-carrying structures 23A and 23B, the thicknesses of the various layers and other dimensions (such as the width D of opening 32 in FIG. 2C) one can achieve a situation in which the lengths of paths taken by ions and electrons are not very much longer than corresponding path lengths in comparable prior art electrolytic cells.

The embodiment of FIG. 2C trades off increased path length for proton conduction against the increased mechanical ruggedness resulting from the presence of substrate 30.

A feature of structures 20A through 20C is that the current-carrying structures 23A and 23B are not required to be porous because it is not necessary for reactants to pass through these structures.

Adjacent unit fuel cells may be connected in parallel by either providing current-carrying structures 23A and 23B that are common to the adjacent unit cells, or by electrically interconnecting current-carrying structures 23A of adjacent cells and current-carrying structures 23B of adjacent cells. Adjacent unit cells may also be electrically isolated from one another, in which case they may be connected in series, as discussed below with reference to FIGS. 6 and 6B. Electrical isolation of unit cell structures may be provided by rendering portions of a catalyst layer non-conducting electrically, by making a catalyst layer discontinuous in its portions between unit cells and/or by providing electrically insulating barriers between the unit cell structures.

Optimizing catalyst layer 24A to promote reactions does not always result in the highest electrical conductivity in catalyst layer 24A. The materials used in the catalyst layer may not be extremely good electrical conductors. However, the losses resulting from the electrical resistivity of catalyst layer 24A can be minimized by laying out each unit cell so that the distance between any point in catalyst layer 24A and the closest part of current-carrying member 23A is small.

For example, in some embodiments of the invention the longest path length from any point within either catalyst layer 24A, 24B to the corresponding current-carrying member 23A, 23B is 5 mm. In other embodiments, the longest path length from any point within either catalyst layer 24A, 24B to the corresponding current-carrying member 23A, 23B is 0.5 mm. Even smaller diameters are also possible. In general, reducing the diameter decreases the ohmic losses associated with electrical current conduction in the catalyst layer. However, as the structure becomes smaller, the volume taken up current carrying members 23A, 23B increases in proportion to the volume of the overall structure, and the space-efficiency of the structure can suffer.

Figure 3:
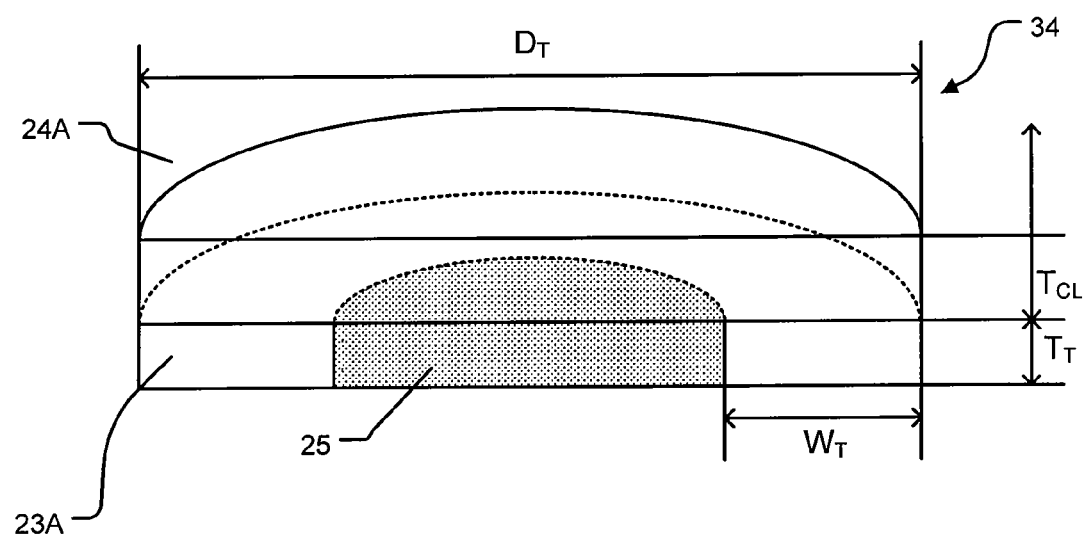
FIG. 3 is a schematic diagram of an electrode according to an embodiment of the invention.

FIG. 3 illustrates a geometry that may be used for approximating the potential drop of an electrode 34 (which may be either an anode or a cathode). Electrode 34 comprises a current-carrying structure 23A having a skin of ion exchange material 25A therein and catalyst layer 24A disposed outside thereof. Only the portion of catalyst layer 24A which is above current-carrying structure 23A is depicted in FIG. 3. Electrode 34 is positioned opposite a corresponding electrode (not shown in FIG. 3) on an outer surface of an ion exchange membrane (not shown in FIG. 3) which may or may not be a composite membrane having substrate 30 embedded therein. In the FIG. 3 embodiment, current-carrying structure 23A comprises an annular trace, wherein $D_T$ is the outer diameter of the circular trace, $T_{CL}$ and $T_T$ are the thicknesses of catalyst layer 24A and the circular trace, respectively, and $W_T$ is the width of the circular trace. In some embodiments, the ratio of trace diameter to trace width ($D_T/W_T$) is at least 10.

Current-carrying structures 23A and 23B are constructed from electrically conductive materials. The following table lists some suitable materials for current-carrying structures 23A and 23B and their electrical conductivities:

| Material | Electrical Conductivity $10^7$ (S/m) |
|---|---|
| Pure Copper | 5.88 |
| Pure Gold | 4.55 |
| Pure Nickel | 1.43 |
| Pure Platinum | 0.96 |
| Tin Oxide ($SnO_2$; applied with a $CO_2$ laser) | 0.003125 |

Any electrically conductive materials may be used to construct current-carrying structures 23A and 23B. In some embodiments, current-carrying structures 23A and 23B are constructed from metals that are either noble to begin with or are coated with a suitable material (Such as PEMCoat™ from INEOS Chlor™ Americas Inc., Wilmington, Del.) so that they resist corrosion. Corrosion can be a problem when metallic conductors are used in electrochemical cells, and fuel cells in particular. The cross sectional dimensions of current-carrying structures 23A and 23B can be chosen based on the total current desired to be carried and the electrical losses which are deemed acceptable in the design.

Current-carrying structures 23A and 23B may have thicknesses, for example, in the range of 5-75 μm. In some embodiments, the thickness of current-carrying structures 23A and 23B is in the range of 25-50 μm. Current-carrying structures 23A and 23B need not have the same thickness. Where current-carrying structures 23A and 23B comprise annular traces, the traces may have a width of 5-200 μm. In some embodiments, the traces may have a thickness on the order to 5 μm and a width on the order of 25 μm. Current-carrying structures 23A and 23B can be formed using any suitable techniques. For example, various printed circuit board fabrication techniques may be used to form structures 23A and 23B. Laminating, PVD, sputtering and plating are examples of techniques that may be used alone or in combination to make the traces.

Catalyst layers 24A and 24B may be constructed from materials which conduct both electrons and the ions formed in the reactions which occur in the cell in which they are employed. (The ions are protons in hydrogen-fuelled PEM fuel cells). Catalyst layers 24A and 24B may comprise any type of electrocatalyst suitable for the application at hand. Catalyst layers 24A and 24B may comprise electrically-conductive porous sintered powder materials, for example. For fuel cells the catalyst layers may comprise platinum on carbon, for example. In some embodiments, catalyst layers 24A and/or 24B comprise mixtures of carbon black and one or more of PTFE powder, PVDF powder, such as Kynar™ powder, and silicon oxide powder. The carbon black may comprise any suitable finely divided carbon material such as one or more of acetylene black carbon, carbon fibers, carbon needles, carbon nanotubes, carbon nanoparticles.

In some embodiments, catalyst layers 24A and 24B are formed of materials having electrical conductivities in the range of 50-200 S/m. Each catalyst layer 24A, 24B may be made up of several layers of different compositions.

In some embodiments, catalyst layers 24A and 24B have thicknesses of 250 μm or less. In some embodiments, the thickness of catalyst layers 24A and 24B is about 10-25 μm. The thickness of catalyst layers 24A and 24B may be about 20 μm, for example. Catalyst layers 24A and 24B need not have the same thickness.

Where ion exchange membrane 25 has a composite structure such as a structure including a substrate 30, substrate 30 provides mechanical strength to membrane 25. The presence of substrate 30 permits membrane 25 to be made thinner than ordinary proton conducting membranes. This decreased thickness can compensate to at least some degree for the more tortuous paths taken by protons which are liberated at locations which are not immediately adjacent to apertures in substrate 30. In some embodiments, the thickness of membrane 25 is in the range of about 5 µm to about 250 µm. The thickness of membrane 25 may be about 25 µm, for example.

Figure 4:
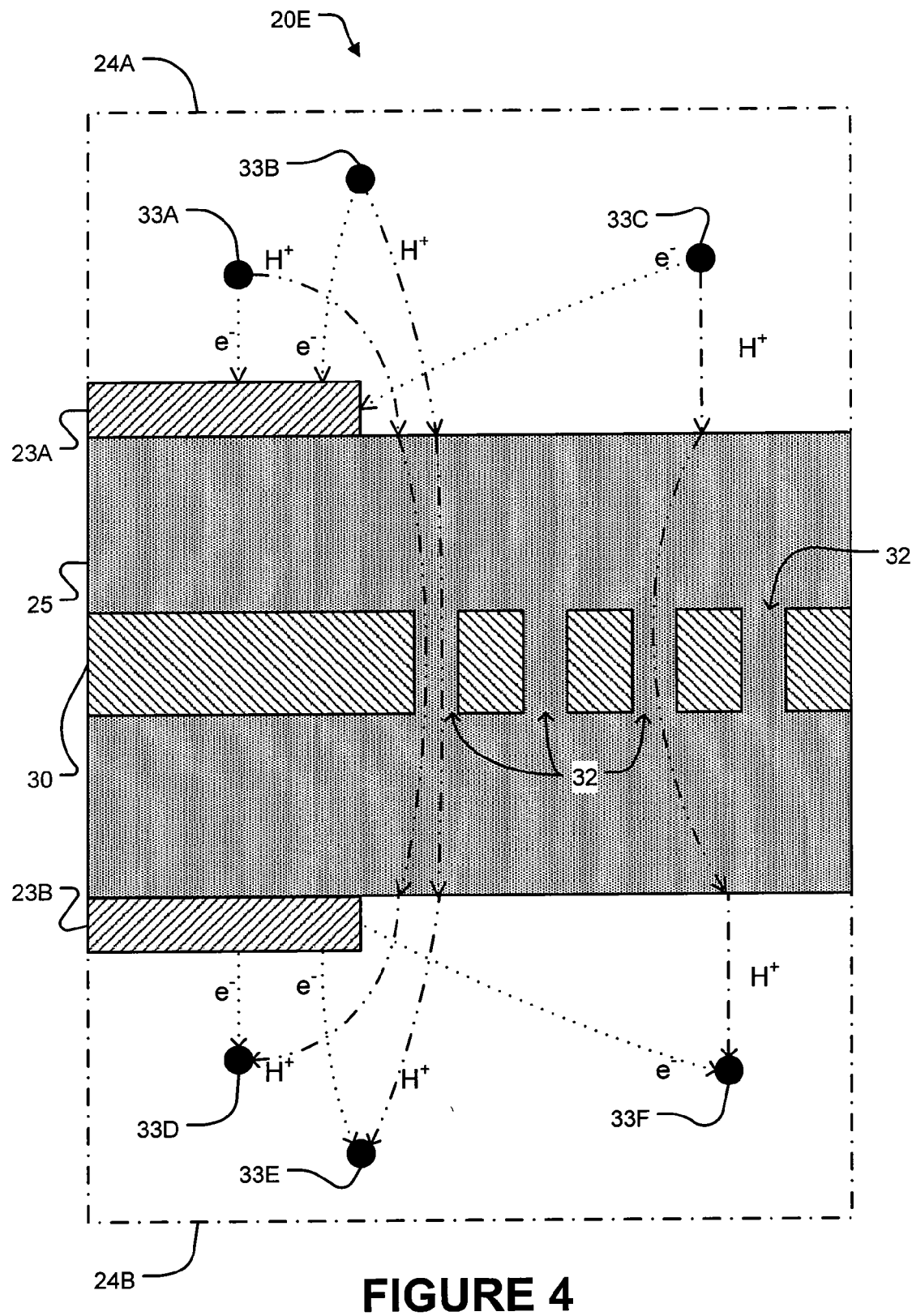
FIG. 4 is a schematic diagram showing electron and proton conduction paths according to an embodiment of the invention.

FIG. 4 shows a portion of a unit cell structure 20E according to another embodiment of the invention. Unit cell structure 20E constitutes a PEM fuel cell with substrate 30 having a plurality of openings 32. A proton exchange material fills openings 32 and surrounds substrate 30 to form ion exchange membrane 25. FIG. 4 shows paths taken by protons ($H^+$) from three example reaction sites 33A, 33B and 33C in catalyst layer 24A of structure 20E, through ion exchange membrane 25 and into catalyst layer 24B to three other example reaction sites 33D, 33E and 33F. FIG. 4 also shows the paths taken by electrons (e) from reaction sites 33A, 33B and 33C to current-carrying structure 23A, and from current-carrying structure 23B to reaction sites 33D, 33 and 33F.

It can be seen that from reaction site 33A and 33B the electron and proton paths through catalyst layer 24A are roughly equal in length. From reaction site 33A, which is over current-carrying structure 23A, the path taken by electrons through catalyst layer 24A is shorter than that taken by protons which must detour around current-carrying structure 23A. From reaction site 33C the path taken through catalyst layer 24A by protons is significantly shorter than that taken by electrons. In the illustrated examples, the paths taken by electrons and protons in catalyst layer 24B to reach reaction sites 33D, 33E and 33F have lengths similar to the lengths of the paths taken in catalyst layer 24A.

The paths taken by protons through ion exchange membrane 25 is not equal, due to the presence of substrate 30. The protons must detour through openings 32. In the examples illustrated, the path taken by the proton travelling from reaction site 33B to reaction site 33E has the shortest distance through ion exchange membrane 25, while the path taken by the proton travelling from reaction site 33C to reaction site 33F has the longest distance through ion exchange membrane 25.

It can be seen in FIG. 4 that the conductive species generated in catalyst layer 24A (protons and electrons) both flow in generally the same direction (e.g. downward in FIG. 4) to get from the reaction site where they are liberated to the conductor that will carry them. Likewise, the conductive species used in the reactions in catalyst layer 24B both flow in generally the same direction (e.g. downward in FIG. 4) to get from the conductor to the reaction site.

Figure 5:
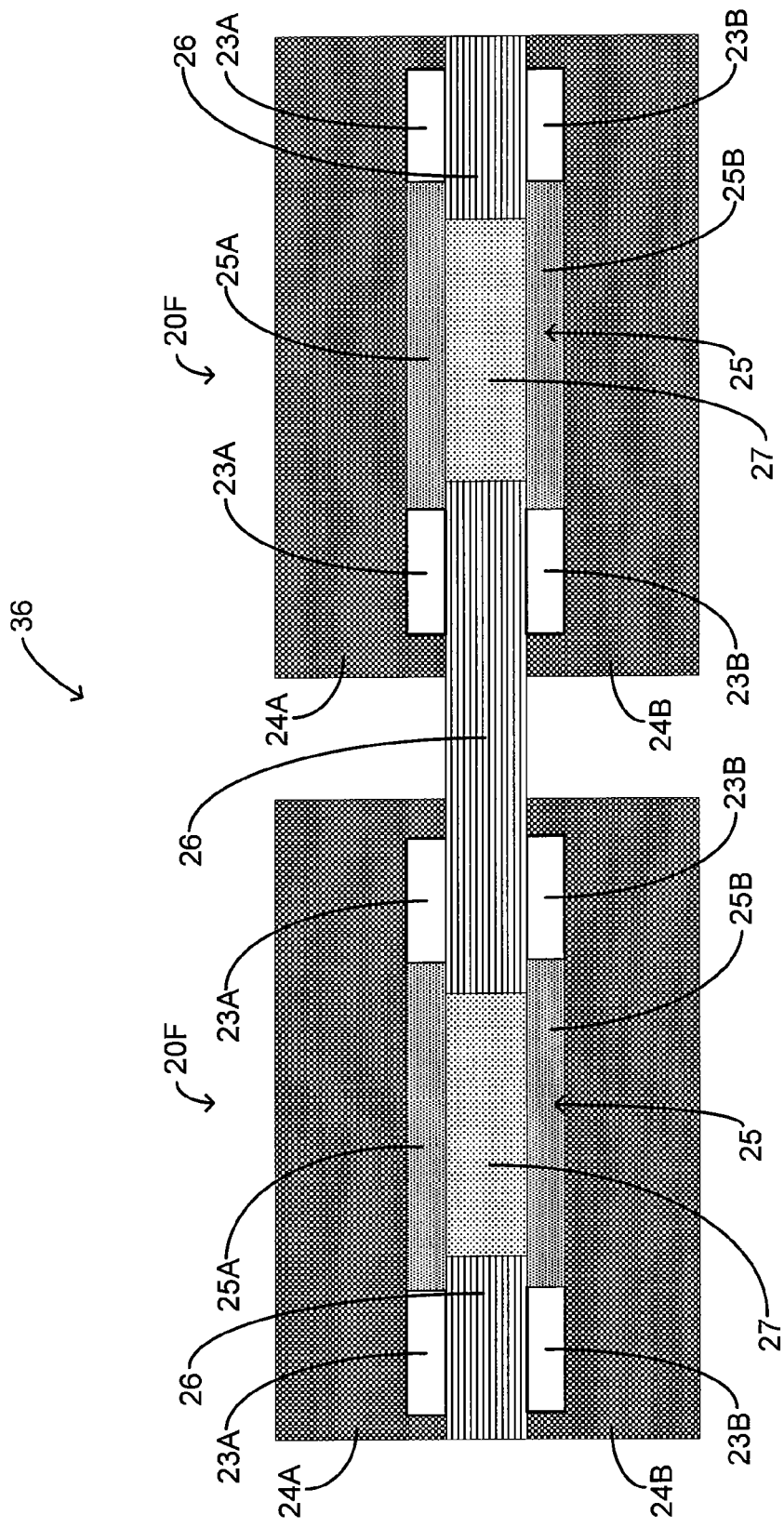
FIG. 5 is a schematic view of a unit cell structure according to another embodiment of the invention.

FIG. 5 shows an electrochemical cell layer 36 comprising two unit cell structures 20F. In the FIG. 5 embodiment, cell layer 36 is formed from a nonconducting sheet 26 which has been treated to form two ion-conducting regions 27. Sheet 26 may, for example, be constructed of a copolymer of tetrafluoroethylene and perfluoro-3,6-dioxa-4-methyl-7-octenesulfonyl fluoride (which is a resin precursor to Nafion™), and may be selectively treated by a hydrolyzation process to form ion-conducting regions 27, as described, for example in the commonly-assigned application U.S. Pat. No. 7,378,176, issued on May 27, 2008 entitled "MEMBRANES AND ELECTROCHEMICAL CELLS INCORPORATING SUCH MEMBRANES" which is referred to above.

Current-carrying structures 23A and 23B are placed on opposite sides of sheet 26 around the periphery of each ion-conducting region 27. Current-carrying structures 23A and 23B may be ring-shaped, or may have different shapes. Ion-conducting skins 25A and 25B may optionally be placed on the outer surfaces of each ion-conducting region 27 within current-carrying structures 23A and 23B, respectively. Ion-conducting skins 25A and 25B and ion-conducting region 27 together form ion-conducting membrane 25 for each structure 20F. Catalyst layers 24A and 24B are formed on the outer surfaces of current-carrying structures 23A and 23B and ion-conducting skins 25A and 25B for each of cell structures 20F. In the illustrated embodiment, catalyst layers 24A and 24B for each cell structure 20F are formed separately. However, a single catalyst layer 24A could cover one side of both structures 20F, and another single catalyst layer 24B could cover the other side of both structures 20F, if cell structures 20F are to be connected in parallel.

Figure 6:
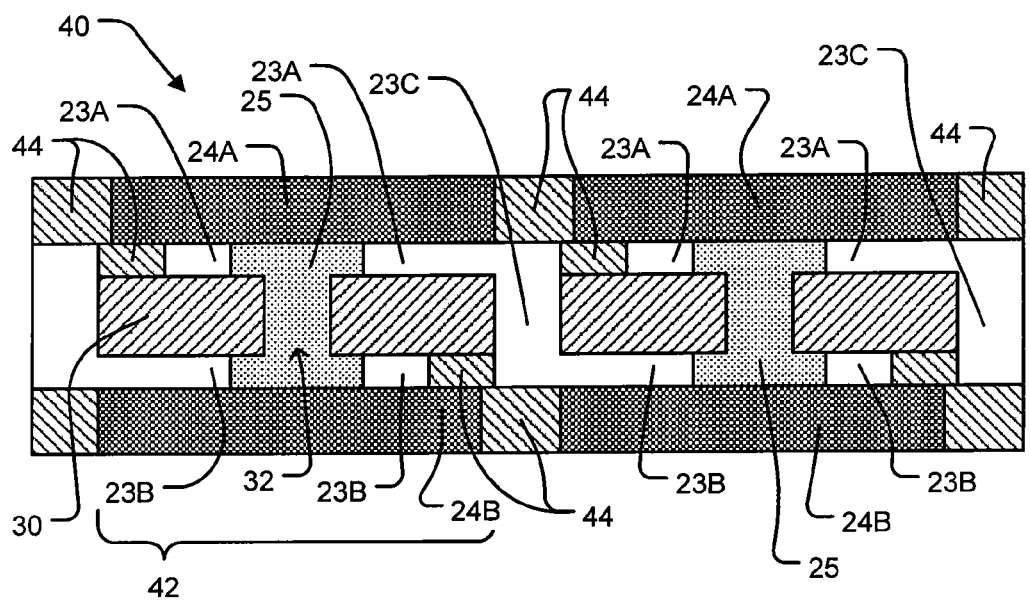
FIG. 6 is a cross section through a membrane electrode assembly of an alternative embodiment of the invention wherein unit cells are connected in series.
Figure 6A:
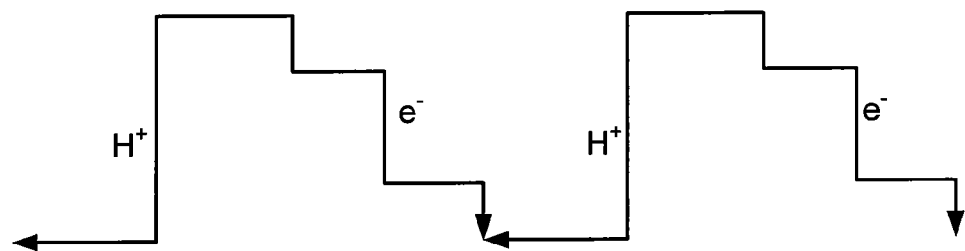
FIG. 6A is a schematic illustration showing current flow and proton flow in the membrane electrode assembly of FIG. 6.

Neighboring unit cells may be electrically isolated from one another. In this case it is possible to electrically interconnect the unit cells in arrangements other than parallel arrangements. Vias may be used to interconnect adjacent unit cells in series. In embodiments in which unit cells are connected in series, catalyst layers 24A of the series connected cells are electrically isolated from one another. FIG. 6 shows a cross section through a part of an electrochemical cell layer 40 in which a number of unit cells 42 are connected in series. FIG. 6A illustrates schematically the paths taken by protons and electrons in the assembly of FIG. 6.

In the embodiment of FIG. 6, regions 44 are electrically insulating. Regions 44 may comprise a dielectric material, an air gap, or the like. Regions 44 electrically isolate adjoining electrochemical unit cells from one another.

Current-carrying structure 23A of each unit cell 42 is connected to the current-carrying structure 23B of the adjacent unit cell 42 by an electrically conductive pathway 23C which passes through a via in substrate 30.

Figure 6B:
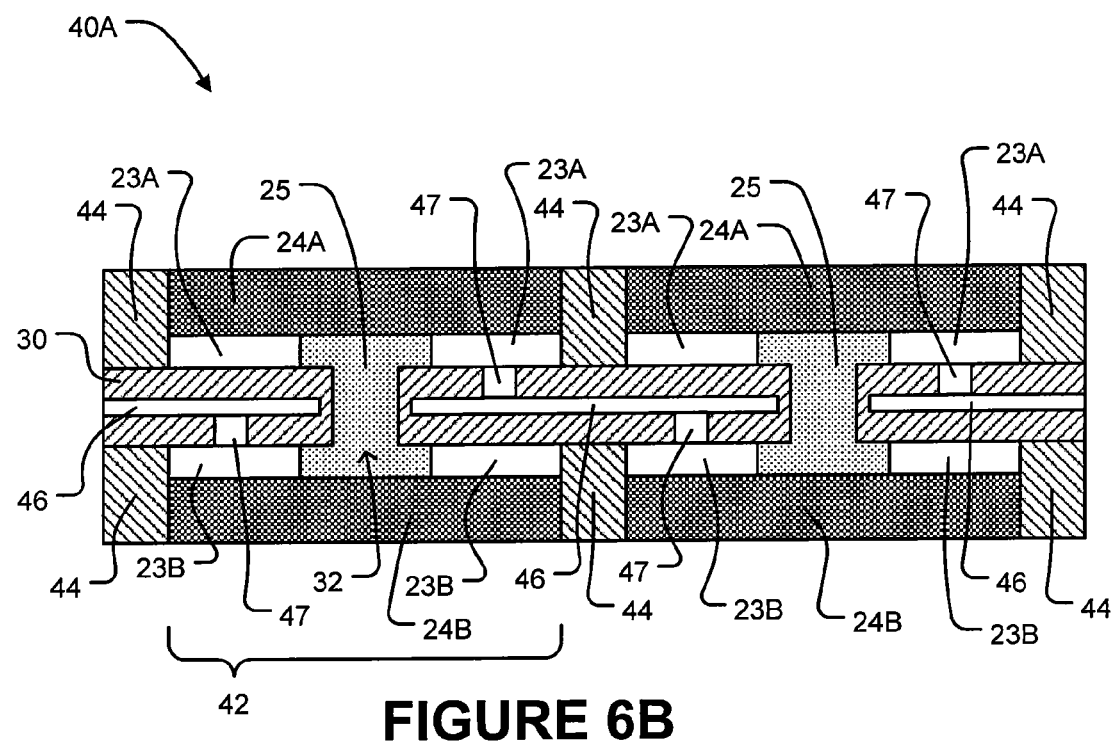
FIG. 6B is a cross section through a membrane electrode assembly in which unit cells are interconnected by current conductors embedded in a substrate.

FIG. 6B shows an electrochemical cell layer 40A wherein unit cells are interconnected with one another by way of electrically conducting paths 46 embedded in substrate 30. Conducting paths 46 may be connected to current-carrying structures 23A and/or 23B by way of electrically conducting vias 47 formed in substrate 30. The conducting paths may be used to interconnect unit cells in series and/or in parallel with one another. A number of independent sets of conducting paths 46 may be provided in or on substrate 30.

Electrochemical cell layer 40A of FIG. 6B may be constructed using a multi-layer circuit board such as a flex circuit. This provides increased current-carrying capacity for the overall current collection system without reducing the surface area available for the cell reactions in the catalyst layers 24A and 24B.

Figure 7:
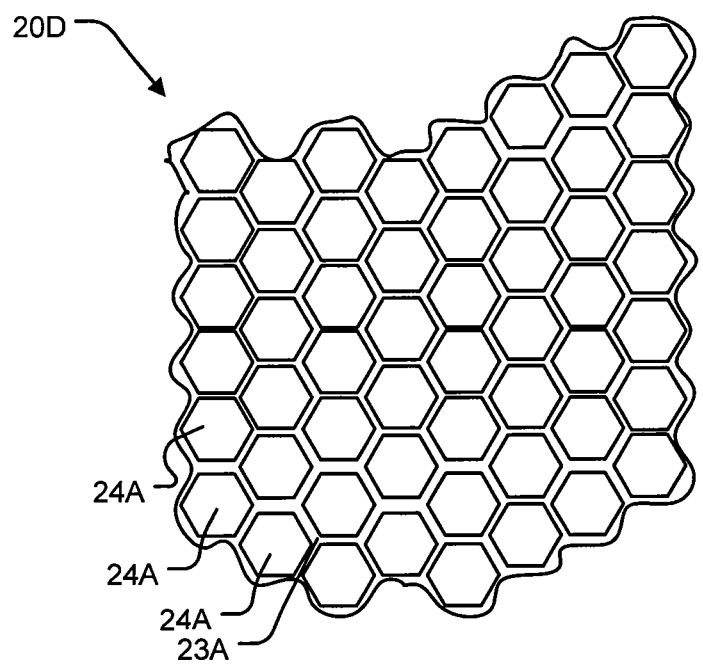
FIG. 7 is a partial plan view of an electrochemical cell layer having an array of hexagonal unit cells.

Unit cells according to embodiments of the invention may have any suitable shapes and may be arrayed in any suitable manner. FIG. 7 shows one example of an electrochemical cell layer comprising a plurality of unit cell structures 20D wherein the unit cells have a hexagonal configuration. The entire surface of structures 20D could be covered with a catalyst layer 24A if desired.

It can be appreciated that various embodiments of the invention described above (e.g., structures 20D and 40 or 40A) can be combined to provide assemblies of unit cells which are electrically interconnected in a series-parallel arrangement of any desired complexity. Generally available electrical conductors (such as suitable metals) have much less resistance to the flow of electrons than do generally available proton conductors to the flow of protons. Therefore, the conductors which carry electrons can have significantly smaller cross sectional areas than do the pathways which carry protons. Substrate 30 may comprise a multi-layer structure (as, for example, a multi-layer circuit board) in which case, conductors for carrying electrical currents may be embedded inside substrate 30.

Figure 8A:
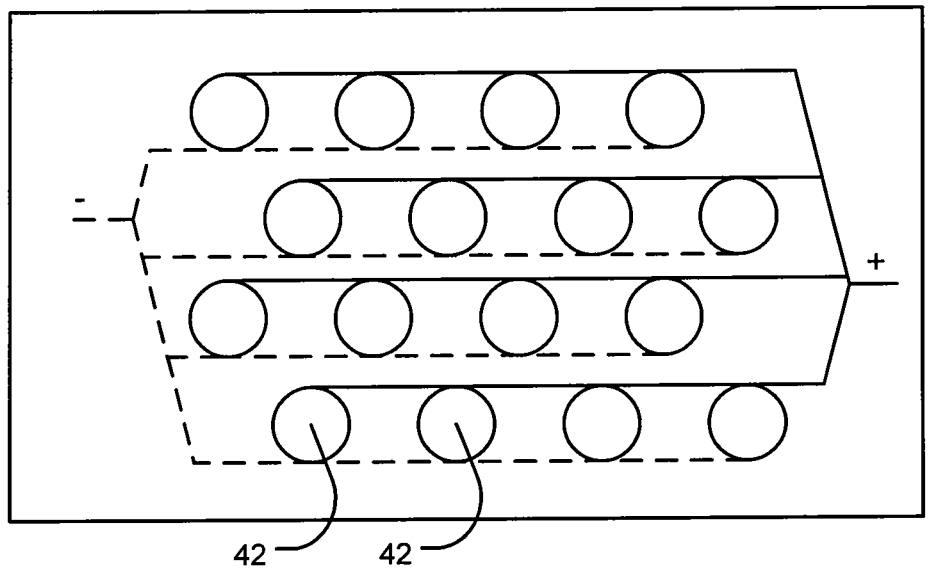
FIGS. 8A, 8B and 8C are respectively schematic views showing electrochemical cell layers having a plurality of unit cells connected in parallel, in series and in series-parallel.
Figure 8B:
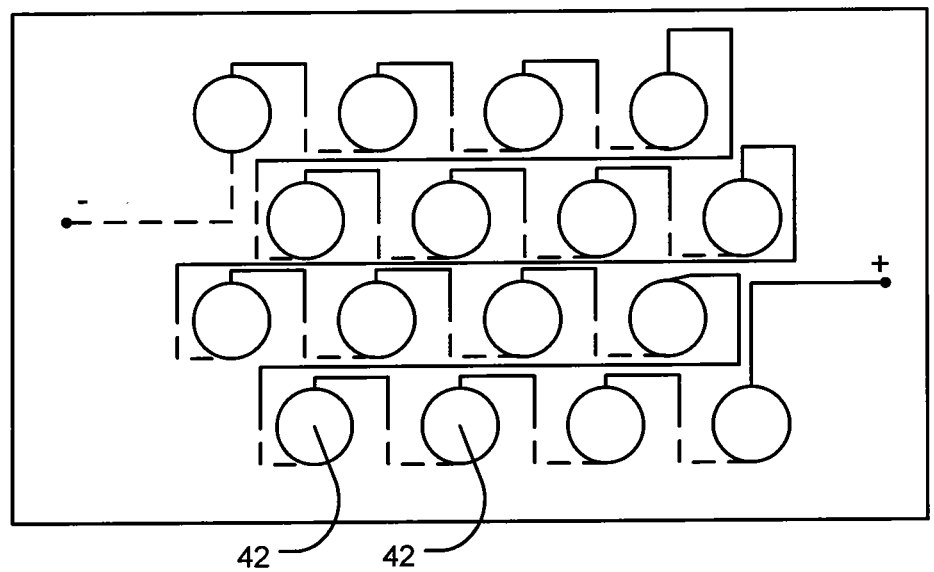
Figure 8C:
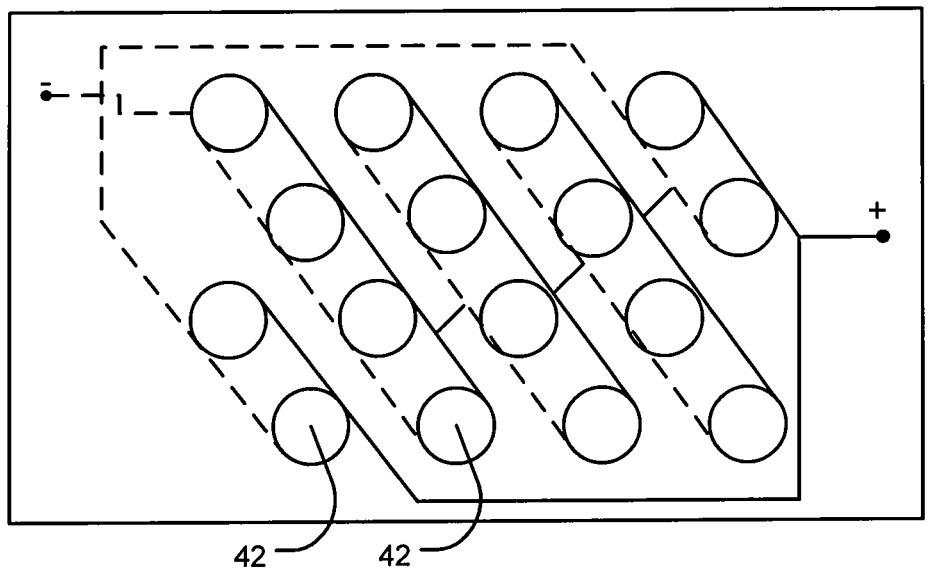

FIGS. 8A, 8B and 8C show various possible ways in which the unit cells in a small array (in this example, a very small array having only 16 unit cells) may be interconnected. In FIG. 8A, unit cells 42 are connected in parallel. The output voltage is 1 (where 1 is the output voltage of a single unit cell) and the output current is N (in this case 16 times the maximum current of one unit cell). An open circuit failure of any one or more unit cells 42 will not prevent the array from operating (at a reduced output current) at the rated voltage (1 unit). However, a short-circuit failure of any one unit cell can prevent the entire array from functioning.

In FIG. 8B, unit cells 42 are arranged in a series configuration. The voltage output is N (in this case 16 times the voltage of a single unit cell). The maximum current output is 1. An open circuit failure of any one or more unit cells will prevent the array from operating. A short-circuit failure of any one or more unit cells will not prevent the array from providing current at a (reduced) maximum output voltage.

FIG. 8C shows a number of unit cells 42 arranged in a series-parallel configuration. In this case, the array is interconnected so that there are four groups of unit cells connected in series. Each group of unit cells comprises four unit cells connected in parallel. Note that each unit cell is connected to a neighbor which is diagonally adjacent. Note that one of the groups of parallel connected unit cells is split into two parts which are located in spatially separated areas of the array. In some embodiments of the invention, unit cells of a group of unit cells are spatially distributed. This makes it less likely that a failure caused by trauma to an area of the array will cause all of the unit cells of a group to fail.

In the embodiment of FIG. 8C the output voltage is 4 units at a current of four times the current capacity of one unit cell. The failure of any unit cell in either a short-circuit mode or an open circuit mode will not prevent the array from providing current although the maximum available output voltage or current may be reduced.

Large arrays of unit cells can be constructed to provide large power-generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. Unlike 'edge collected' cells, the conductive path lengths within this structure may be kept extremely short so that ohmic losses in the catalyst layer are minimized.

An electrochemical cell layer comprising a plurality of unit cells may be constructed by providing a substrate comprising a plurality of ion conducting regions. Such a substrate could be provided, for example by selectively treating a sheet of non- or partially-conducting material to form the ion conducting regions, or by selectively treating a sheet of ion conducting material to form non-conducting regions, as described, for example in the commonly-assigned U.S. Pat. No. 7,378, 176, issued on May 27, 2008 entitled "MEMBRANES AND ELECTROCHEMICAL CELLS INCORPORATING SUCH MEMBRANES" which is referred to above. Current-carrying structures may be formed on each side of the substrate around the periphery of each ion conducting region by means of laminating, PVD, sputtering, plating, or other suitable techniques. An electrochemical reaction layer, which may comprise a catalyst, may be deposited on each side of the ion conducting regions, in at least partial contact with the current-carrying structures.

Individual unit cells may be very small. Other factors being equal, smaller unit cells can operate at improved efficiencies because the conduction paths for protons and electrons can be shorter in small unit cells than in larger unit cells. The unit cells can be very small, for example, 1 mm in diameter or smaller, or even 500 µm in diameter or smaller. In some embodiments of the invention, unit cells have active areas of about e.g. 0.01 $cm^2$. A typical air breathing fuel cell comprising a 1 mm diameter unit cell may produce between about 1 and 3 mW of power. A fuel cell layer comprising 300-1000 such cells could produce 1 W of power.

An electrochemical cell according to this invention may have as few as 1 unit cell or may have a very large number, thousands or even millions, of unit cells formed on one substrate. Electrochemical cell structures made according to some prototype embodiments of this invention have in excess of 500 unit cells, for example.

Figure 9:
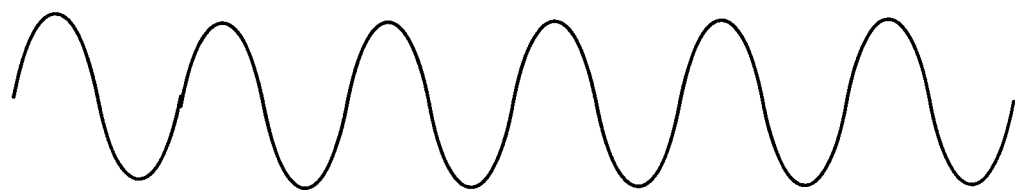
FIG. 9 is a side view of a pleated structure on which unit cells according to the invention may be disposed.

So far, substrate 30 and membrane electrode assemblies generally have been described as being planar. This is not necessary. Unit cells according to the invention may be used in an electrochemical cell layer that is pleated or undulating as shown, for example, in FIG. 9. Such layers are very compact. Substantially the entire undulating area can be made active. Further, no porous layer is required beyond the catalyst layer and no unsupported face seals are required. Thus the undulating area can be tightly pleated since there is no porous medium between the pleats to interfere with the diffusion of fuel and oxidant to the exposed catalyst layers of the unit cells. Unit cells according to the invention may be incorporated in a pleated layer structure as described, for example, in the commonly-assigned U.S. Pat. No. 7,201,986, issued on Apr. 10, 2007, entitled "ELECTROCHEMICAL CELLS FORMED ON PLEATED SUBSTRATES", which is hereby incorporated herein by reference.

Figure 10:
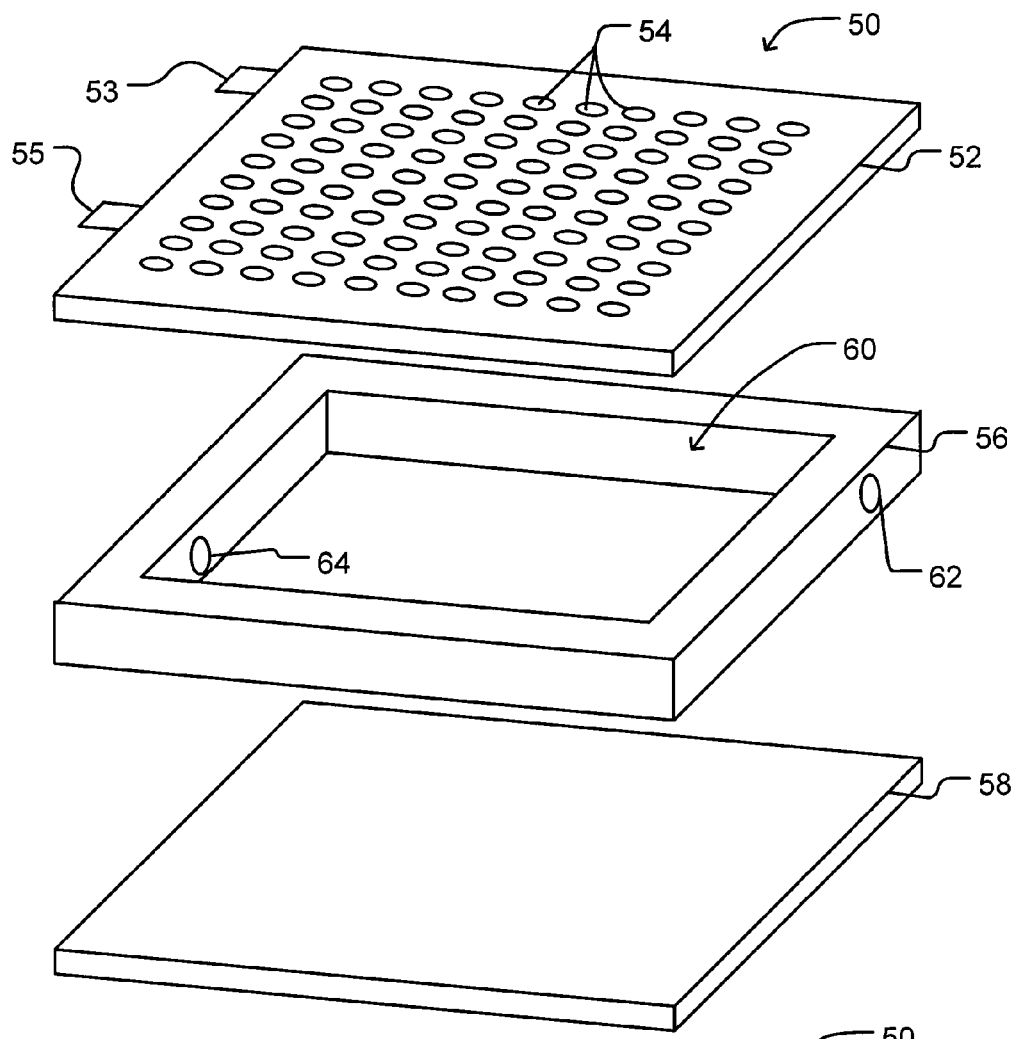
FIG. 10 is an exploded view of a fuel cell device according to an embodiment of the invention.
Figure 10A:
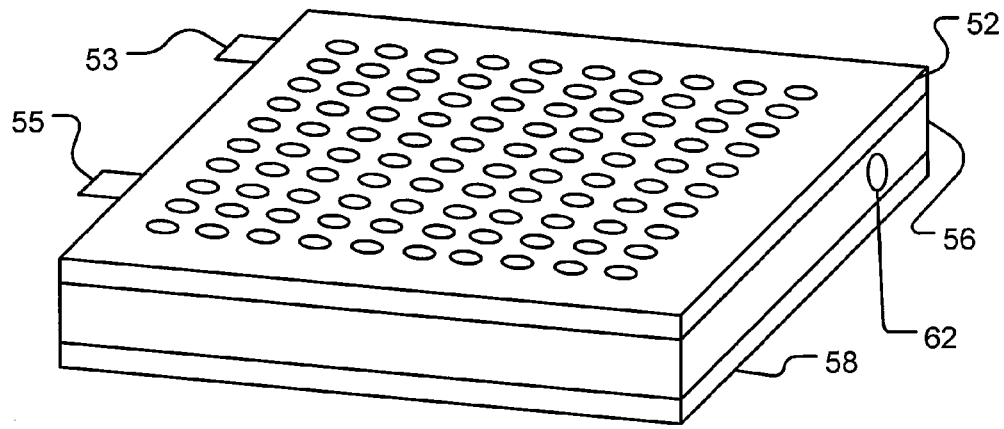
FIG. 10A shows the fuel cell device of FIG. 10 in assembled form.

FIGS. 10 and 10A show a fuel cell device 50 according to one embodiment of the invention. Fuel cell device 50 comprises a fuel cell layer 52 comprising a plurality of unit cells 54. Fuel cell layer 52 comprises a positive terminal 53 and a negative terminal 55, which may be connected to an external circuit (not shown). Unit cells 54 may be connected between positive terminal 53 and negative terminal 55 in any suitable manner. Fuel cell layer 52 is sealed to a spacer 56, which is in turn sealed to a base 58. Fuel cell layer 52, spacer 56 and base 58 define a plenum 60 for holding fuel, which may be introduced through fuel inlet 62. An optional fuel outlet 64 may be provided if fuel flow is required, or if recirculation of fuel is required. Base 58 could optionally be replaced with another fuel cell layer, oriented oppositely to layer 52. Also, spacer 56 could be built into layer 52, such that two such layers could be bonded back to back to form a fuel cell device having two fuel cell layers.

Figure 11:
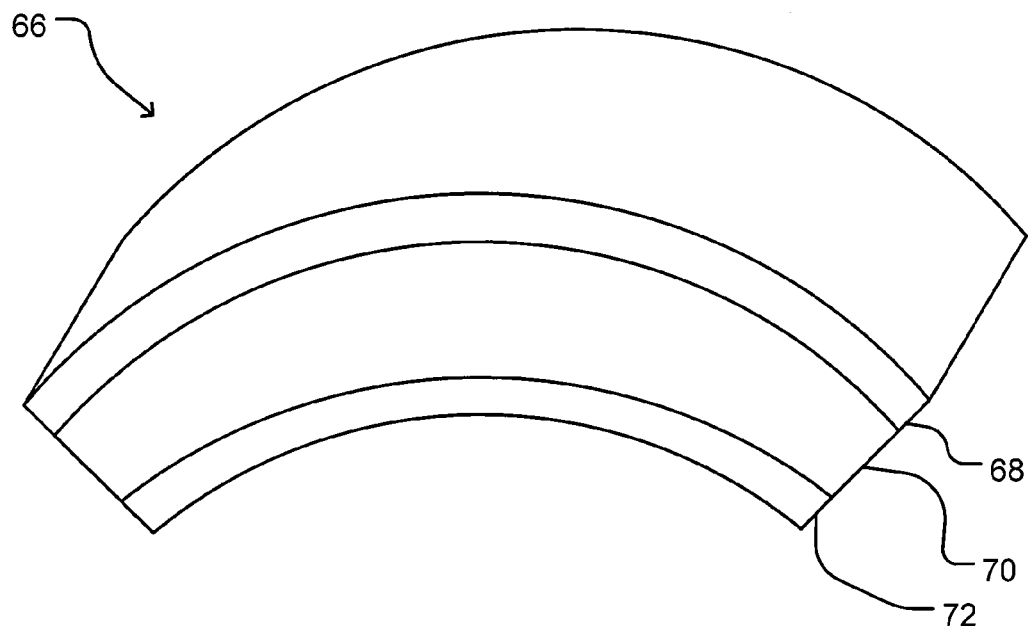
FIG. 11 shows a fuel cell device according to another embodiment of the invention.

FIG. 11 shows a non-planar fuel cell device 66 according to another embodiment of the invention. Device 66 is the same as device 50, except that fuel cell layer 68, spacer 70 and base 72 are curved. In the example illustrated in FIG. 11, layer 68, spacer 70 and base 72 are shaped to conform to the wall of a cylinder, but it is to be understood that other non-planar configurations are equally possible.

Figure 12:
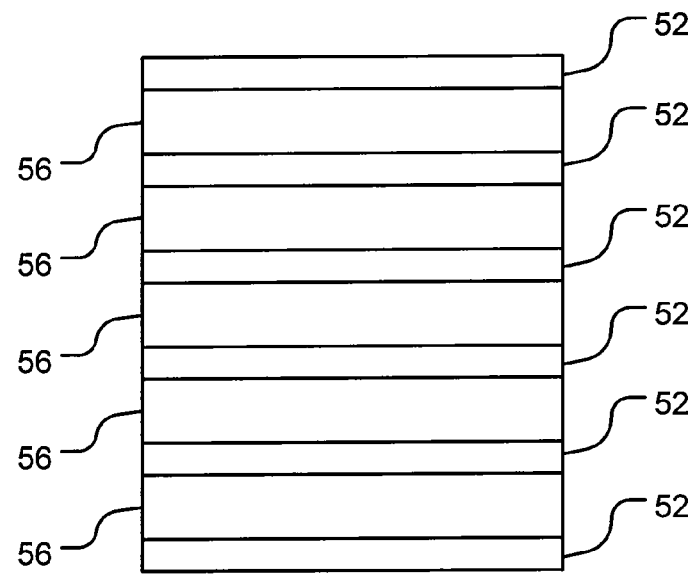
FIG. 12 shows a stack of fuel cell layers according to another embodiment of the invention.

FIG. 12 shows a stack of fuel cell layers 52 and spacers 56 according to another embodiment of the invention. Plenums defined by spacers 56 may be filled with fuel and oxidant in alternating fashion to provide reactants to layers 52.

Some embodiments of the invention provide unit cells wherein an exposed area of a catalyst layer is greater than a cross sectional area of an ion-conducting layer through which ions liberated by reactions in the catalyst layer can pass through the cell. This can be seen, for example, in FIG. 2D wherein a surface 124 of catalyst layer 24A has a surface area larger than a cross sectional area of the portion 125 of ion-conducting layer 25 through which ions (e.g. protons) generated in catalyst layer 24A pass to the opposing catalyst layer 24B.

The invention also provides methods for operating electrochemical cells. One such method comprises: providing an electrochemical cell having: a catalyst-containing electrochemical reaction layer having an outer face and an inner face; an electrical current-carrying structure underlying the electrochemical reaction layer at least in part; and an ion-conducting layer in contact with the inner face of the electrochemical reaction layer; allowing a reactant to diffuse into the electrochemical reaction layer; allowing the reactant to undergo a catalysed electrochemical reaction to produce an ion at a location in the electrochemical reaction layer between a surface of the electrochemical layer and the current-carrying layer; and, allowing the ion to travel to the ion-conducting layer along a path that avoids the current-carrying structure.

The path taken by the ion is not substantially anti-parallel to a path taken by the electrical current between the location and the current-carrying structure.

Where a component (e.g. a membrane, layer, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Figure 13:
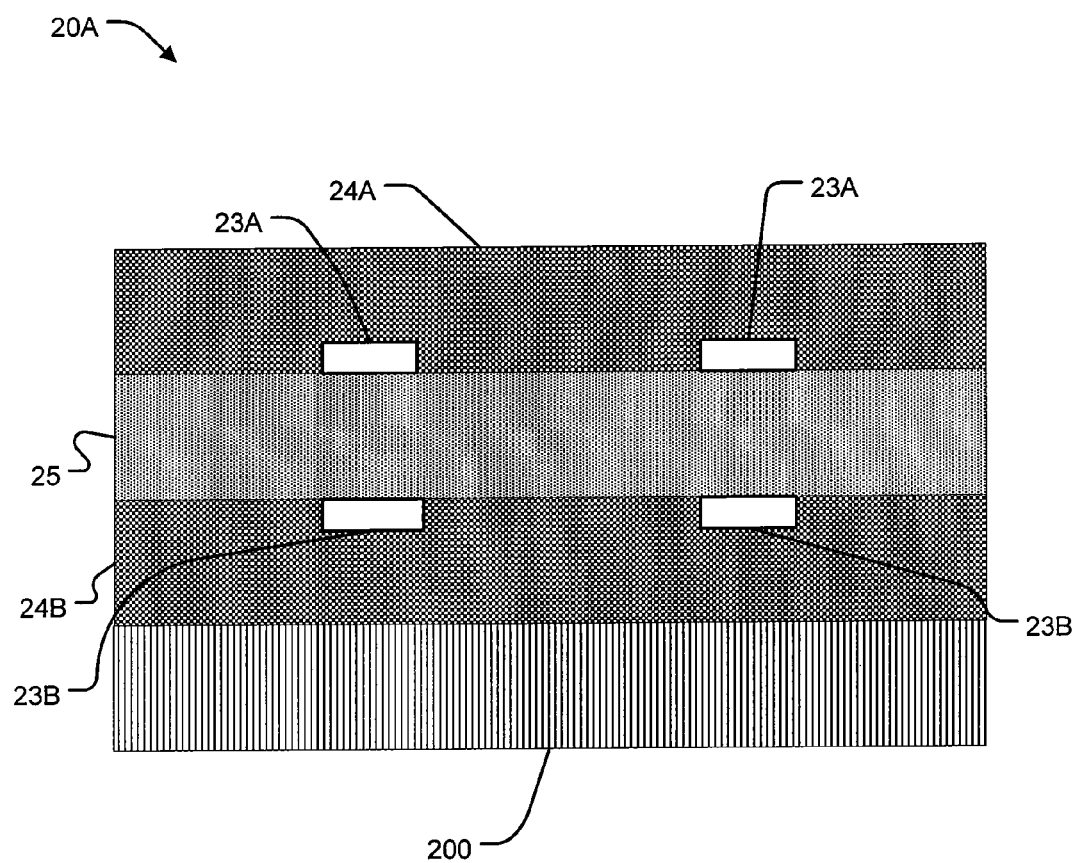
FIG. 13 is a section through a fuel cell having a filter layer overlying a catalyst layer.

In some embodiments of the invention, a filter layer may be provided on the outer surface of one or both of catalyst layers 24A, 24B. The filter layer may be used to remove undesired materials from reactants before they reach catalyst layer 24A or 24B. For example, a filter layer placed over the cathode catalyst layer may be impermeable to water but permeable to air, to allow air to reach the cathode of the unit cell, while preventing water from reaching the unit cell. FIG. 13 illustrates an example of structure 20A wherein a filter layer 200 is provided on the outer surface of catalyst layer 24B.

It is noteworthy that in a number of the embodiments described above, electrical current from electrochemical reactions occurring in a catalyst layer is collected in the plane of the catalyst layer.

As will be apparent to those skilled in the art in the light of the foregoing disclosure, many alterations and modifications are possible in the practice of this invention without departing from the spirit or scope thereof. For example:

This invention has application to fuel cells as well as electrochemical cells of other types such as chlor-alkali reaction cells and electrolysis cells.

The invention is not limited to gaseous fuels. Liquid fuels may also be used with appropriate material selections.

The anodes and cathodes of the unit cells do not need to be the same size. The anodes may, for example, be somewhat smaller than the cathodes. Any exposed traces could be located on the anode side of the membrane electrode assemblies.

The catalyst layers are layers where electrochemical reactions occur. In some embodiments these layers may not comprise catalysts in the strict sense of the term.

In some embodiments, the current-carrying structures are depicted as being in direct contact with the ion exchange membrane, but this is not necessary. It is to be understood that the current-carrying structures may be separated from the ion exchange membrane by another material, such as a portion of the catalyst layer.

Accordingly, the scope of the invention is to be construed in accordance with the substance defined by the following claims.

What is claimed is:

1. A method of producing electricity comprising:
    directing a fuel to contact an electrochemical cell layer, the electrochemical cell layer including
        a plurality of electrochemical reaction regions forming at least a part of a first surface and at least a part of a second surface of the electrochemical cell layer;
        at least one ion exchange membrane;
        at least one substrate component positioned between the first and second surfaces; and
        a plurality of current-carrying structures, each current-carrying structure in electrical communication with at least one of the electrochemical reaction regions forming a part of the first surface and at least one of the electrochemical reaction regions forming a part of the second surface and each current-carrying structure extending through a portion of the electrochemical cell layer, wherein at least a portion of at least one of the current-carrying structures extends through the at least one substrate component,
    wherein the fuel contacts the electrochemical reaction regions on the first surface;
    directing an oxidant to contact the electrochemical reaction regions on the second surface; and
    directing an electrical current through the current-carrying structures and through the electrochemical cell layer.

2. The method of claim 1, wherein the electrochemical cell layer includes a plurality of electrically insulating regions between adjacent electrochemical reaction regions.

3. The method of claim 2, wherein the electrically insulating regions include an air gap.

4. The method of claim 3, wherein the air gap exposes at least a portion of the at least one substrate component.

5. The layer of claim 3, wherein the air gap exposes at least a portion of at least one of the current-carrying structures.

6. The method of claim 1, wherein the electrochemical reaction regions are disposed on the at least one ion exchange membrane.

7. The layer of claim 1, wherein the electrochemical reaction regions are disposed on the at least one substrate component.

8. The method of claim 1, wherein the electrochemical reaction regions include a catalyst material.

9. The method of claim 1, wherein the array of electrochemical cells is an array of fuel cells.

10. The layer of claim 9, wherein the fuel cells are proton exchange membrane fuel cells.

11. The method of claim 1, wherein the array is substantially planar.

12. The method of claim 1, further including a gas diffusion layer positioned on the electrochemical reaction regions.

13. The method of claim 1, wherein the current-carrying structures direct a current orthogonally to the array.

14. The method of claim 1, wherein the layer includes at least two substrate components.

15. The method of claim 14, each ion exchange membrane contacts at least two substrate components.

16. The method of claim 1, wherein electrochemical reaction regions of the first surface are aligned with electrochemical reaction regions of the second surface.

17. The method of claim 1, wherein the at least one substrate components are formed from a dielectric material and do not conduct electric current.

18. The method of claim 1, wherein at least one of the current-carrying structures is in contact with the ion exchange membrane.

\* \* \* \* \*